(12) United States Patent
Colenbrander et al.

(10) Patent No.: US 11,998,840 B2
(45) Date of Patent: Jun. 4, 2024

(54) DETERMINING TARGETED DISPLAY TIME OF A VIDEO FRAME FOR A CLIENT BASED ON SERVER SIDE TIMING INFORMATION

(71) Applicant: Sony Interactive Entertainment Inc., Tokyo (JP)

(72) Inventors: Roelof Roderick Colenbrander, Costa Mesa, CA (US); Mark E. Cerny, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/960,020

(22) Filed: Oct. 4, 2022

(65) Prior Publication Data

US 2023/0024723 A1  Jan. 26, 2023

Related U.S. Application Data

(63) Continuation of application No. 17/008,502, filed on Aug. 31, 2020, now Pat. No. 11,458,391.

(60) Provisional application No. 62/909,166, filed on Oct. 1, 2019, provisional application No. 62/909,172, filed on Oct. 1, 2019, provisional application No. 62/909,175, filed on Oct. 1, 2019.

(51) Int. Cl.
*A63F 13/355*       (2014.01)
*A63F 13/358*       (2014.01)
*A63F 13/52*        (2014.01)
*A63F 13/537*       (2014.01)
*H04L 65/61*        (2022.01)
*H04L 67/12*        (2022.01)

(52) U.S. Cl.
CPC .......... *A63F 13/355* (2014.09); *A63F 13/358* (2014.09); *A63F 13/52* (2014.09); *A63F 13/537* (2014.09); *A63F 2300/534* (2013.01); *A63F 2300/538* (2013.01); *H04L 65/61* (2022.05); *H04L 67/12* (2013.01)

(58) Field of Classification Search
CPC ...... A63F 13/355; A63F 13/358; A63F 13/52; A63F 13/537; A63F 2300/534; A63F 2300/538; H04L 65/61; H04L 67/12
See application file for complete search history.

(56) References Cited

U.S. PATENT DOCUMENTS

| | | | |
|---|---|---|---|
| 9,380,099 B2* | 6/2016 | Amidei | H04N 21/43076 |
| 9,795,879 B2* | 10/2017 | Colenbrander | A63F 13/493 |
| 2006/0039483 A1* | 2/2006 | Lee | H04N 19/89 |
| | | | 375/E7.18 |
| 2010/0166064 A1* | 7/2010 | Perlman | H04N 21/6377 |
| | | | 375/240.07 |

* cited by examiner

*Primary Examiner* — Reginald A Renwick
(74) *Attorney, Agent, or Firm* — PENILLA IP, APC

(57) ABSTRACT

A method for cloud gaming. The method including generating a video frame when executing a video game at a server. The method including performing a scan-out process to deliver the video frame to an encoder configured to compress the video frame, wherein the scan-out process begins at a flip-time of the video frame. The method including transmitting the video frame that is compressed to a client. The method including determining at the client a target display time for the video frame. The method including scheduling at the client a display time for the video frame based on the target display time.

20 Claims, 19 Drawing Sheets

DETERMINING TARGETED DISPLAY TIME OF A VIDEO FRAME FOR A CLIENT BASED ON SERVER SIDE TIMING INFORMATION

CLAIM OF PRIORITY

This application claims priority to and the benefit of U.S. patent application Ser. No. 17/008,502, filed on Aug. 31, 2020, entitled System And Method For Improving Smoothness In Cloud Gaming Applications"; which claims priority to and the benefit of U.S. Provisional App. Ser. No. 62/909,166 filed on Oct. 1, 2019, entitled "High Speed Scan-Out Of Server Display Buffer For Cloud Gaming Applications," the disclosures of which are incorporated herein by reference in their entireties for all purposes. This application claims priority to and the benefit of U.S. patent application Ser. No. 17/008,502, filed on Aug. 31, 2020, entitled System And Method For Improving Smoothness In Cloud Gaming Applications"; which claims priority to and the benefit of U.S. Provisional App. Ser. No. 62/909,172 filed on Oct. 1, 2019, entitled" Early Scan-Out Of Server Display Buffer At Flip-Time For Cloud Gaming Applications," the disclosures of which are incorporated herein by reference in their entireties for all purposes. This application claims priority to and the benefit of U.S. patent application Ser. No. 17/008, 502, filed on Aug. 31, 2020, entitled System And Method For Improving Smoothness In Cloud Gaming Applications"; which claims priority to and the benefit of U.S. Provisional App. Ser. No. 62/909,175 filed on Oct. 1, 2019, entitled "System and Method For Improving Smoothness in Cloud Gaming Applications," the disclosures of which are incorporated herein by reference in their entireties for all purposes.

TECHNICAL FIELD

The present disclosure is related to streaming systems configured for streaming content across a network, and more specifically to performing high-speed scan-out operations at a cloud gaming server and/or performing early scan-out operations at the server for reducing latency between the cloud gaming server and a client, wherein smoothness of client display of video may be improved with transmission of ideal display times to the client.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like. Unfortunately, the demand is also pushing up against limits of the capabilities of network connections and the processing performed at the server and the client that is responsive enough to render high quality images as delivered to the client. For example, results of all gaming activities that are performed on the server need to be compressed and transmitted back to the client at low millisecond latency for the best user experience. Round-trip latency may be defined as the overall time between the user's controller input and the display of the video frames at the client; it may include processing and transmission of the control information from controller to client, processing and transmission of the control information from client to server, usage of that input at the server to generate a video frame responsive to the input, processing and transfer of the video frame to the encoding unit (e.g. scan-out), encode of the video frame, transmission of the encoded video frame back to the client, reception and decoding of the video frame, and any processing or staging of the video frame prior to its display. One-way latency may be defined as being the part of the round-trip latency consisting of the time from beginning of transfer of the video frame to the encoding unit (e.g. scan-out) at the server to the beginning of display of video frame at the client. A portion of the round-trip and one-way latency is associated with time taken for the data streams to be sent from client to server and server to client over a communications network. Another portion is associated with processing at client and server; improvements in these operations, such as advanced strategies related to frame decoding and display, can result in substantially reduced round-trip and one-way latency between the server and the client and provide a higher quality experience to users of cloud gaming services.

It is in this context that embodiments of the disclosure arise.

SUMMARY

Embodiments of the present disclosure relate to streaming systems configured for streaming content (e.g., gaming) across a network, and more specifically to performing high speed scan-out operations or performing scan-out earlier, such as before an occurrence of the next system VSYNC signal or at a flip time of the corresponding video frame, for delivery of modified video frames to an encoder.

Embodiments of the present disclosure disclose a method for cloud gaming. The method including generating a video frame when executing a video game at a server. The method including performing a scan-out process by scanning the video frame scanline-by-scanline and one or more user interface features scanline-by-scanline to one or more input frame buffers, and compositing and blending the video frame and the one or more user interface features into a modified video frame. The method including in the scan-out process, scanning the modified video frame to an encoder at the server scanline-by-scanline. The method including beginning in the scan-out process scanning the video frame and the one or more user interface features to the one or more input frame buffers at a corresponding flip-time for the video frame.

In another embodiment, a non-transitory computer-readable medium storing a computer program for cloud gaming is disclosed. The computer-readable medium including program instructions for generating a video frame when executing a video game at a server. The computer-readable medium including program instructions for performing a scan-out process by scanning the video frame scanline-by-scanline and one or more user interface features scanline-by-scanline to one or more input frame buffers, and compositing and blending the video frame and the one or more user interface features into a modified video frame. The computer-readable medium including program instructions for in the scan-out process, scanning the modified video frame to an encoder at the server scanline-by-scanline. The computer-readable medium including program instructions for beginning in the scan-out process scanning the video frame and the one or more user interface features to the one or more input frame buffers at a corresponding flip-time for the video frame.

In still another embodiment, a computer system includes a processor, and memory coupled to the processor and having stored therein instructions that, if executed by the computer system, cause the computer system to execute a method for cloud gaming. The method including generating a video frame when executing a video game at a server. The method including performing a scan-out process by scanning the video frame scanline-by-scanline and one or more user interface features scanline-by-scanline to one or more input frame buffers, and compositing and blending the video frame and the one or more user interface features into a modified video frame. The method including in the scan-out process, scanning the modified video frame to an encoder at the server scanline-by-scanline. The method including beginning in the scan-out process scanning the video frame and the one or more user interface features to the one or more input frame buffers at a corresponding flip-time for the video frame.

In another embodiment, a method for cloud gaming is disclosed. The method including generating a video frame when executing a video game at a server. The method including performing a scan-out process to deliver the video frame to an encoder configured to compress the video frame, wherein the scan-out process begins at a flip-time of the video frame. The method including transmitting the video frame that is compressed to a client. The method including determining at the client a target display time for the video frame. The method including scheduling at the client a display time for the video frame based on the target display time.

In another embodiment, a non-transitory computer-readable medium storing a computer program for cloud gaming is disclosed. The computer-readable medium including program instructions for generating a video frame when executing a video game at a server. The computer-readable medium including program instructions for performing a scan-out process to deliver the video frame to an encoder configured to compress the video frame, wherein the scan-out process begins at a flip-time of the video frame. The computer-readable medium including program instructions for transmitting the video frame that is compressed to a client. The computer-readable medium including program instructions for determining at the client a target display time for the video frame. The computer-readable medium including program instructions for scheduling at the client a display time for the video frame based on the target display time.

In still another embodiment, a computer system includes a processor, and memory coupled to the processor and having stored therein instructions that, if executed by the computer system, cause the computer system to execute a method for cloud gaming. The method including generating a video frame when executing a video game at a server. The method including performing a scan-out process to deliver the video frame to an encoder configured to compress the video frame, wherein the scan-out process begins at a flip-time of the video frame. The method including transmitting the video frame that is compressed to a client. The method including determining at the client a target display time for the video frame. The method including scheduling at the client a display time for the video frame based on the target display time.

In another embodiment, a method for cloud gaming is disclosed. The method including generating a video frame when executing a video game at a server. The method including performing a scan-out process to deliver the video frame to an encoder configured to compress the video frame, wherein the scan-out process includes scanning the video frame scanline-by-scanline and one or more user interface features scanline-by-scanline to one or more input frame buffers, and compositing and blending the video frame and the one or more user interface features into a modified video frame, wherein the scan-out process begins at a flip-time of the video frame. The method including transmitting the modified video frame that is compressed to a client. The method including determining at the client a target display time for the modified video frame. The method including scheduling at the client a display time for the modified video frame based on the target display time.

In another embodiment, a non-transitory computer-readable medium storing a computer program for cloud gaming is disclosed. The computer-readable medium including program instructions for generating a video frame when executing a video game at a server. The computer-readable medium including program instructions for performing a scan-out process to deliver the video frame to an encoder configured to compress the video frame, wherein the scan-out process includes scanning the video frame scanline-by-scanline and one or more user interface features scanline-by-scanline to one or more input frame buffers, and compositing and blending the video frame and the one or more user interface features into a modified video frame, wherein the scan-out process begins at a flip-time of the video frame. The computer-readable medium including program instructions for transmitting the modified video frame that is compressed to a client. The computer-readable medium including program instructions for determining at the client a target display time for the modified video frame. The computer-readable medium including program instructions for scheduling at the client a display time for the modified video frame based on the target display time.

In still another embodiment, a computer system includes a processor, and memory coupled to the processor and having stored therein instructions that, if executed by the computer system, cause the computer system to execute a method for cloud gaming. The method including generating a video frame when executing a video game at a server. The method including performing a scan-out process to deliver the video frame to an encoder configured to compress the video frame, wherein the scan-out process includes scanning the video frame scanline-by-scanline and one or more user interface features scanline-by-scanline to one or more input frame buffers, and compositing and blending the video frame and the one or more user interface features into a modified video frame, wherein the scan-out process begins at a flip-time of the video frame. The method including transmitting the modified video frame that is compressed to a client. The method including determining at the client a target display time for the modified video frame. The method including scheduling at the client a display time for the modified video frame based on the target display time.

In another embodiment, a method for cloud gaming is disclosed. The method including generating a video frame when executing a video game at a server, wherein the video frame is stored in a frame buffer. The method including determining a maximum pixel clock for a chip-set including a scan-out block. The method including determining a frame rate setting based on the maximum pixel clock and an image size of a target display of a client. The method including determining a speed setting value for the chip-set. The method including scanning the video frame into the scan-out block from the frame buffer. The method including scanning-out the video frame from the scan-out block to the encoder at the speed setting value.

In another embodiment, a non-transitory computer-readable medium storing a computer program for cloud gaming is disclosed. The computer-readable medium including program instructions for generating a video frame when executing a video game at a server, wherein the video frame is stored in a frame buffer. The computer-readable medium including program instructions for determining a maximum pixel clock for a chip-set including a scan-out block. The computer-readable medium including program instructions for determining a frame rate setting based on the maximum pixel clock and an image size of a target display of a client. The computer-readable medium including program instructions for determining a speed setting value for the chip-set. The computer-readable medium including program instructions for scanning the video frame into the scan-out block from the frame buffer. The computer-readable medium including program instructions for scanning-out the video frame from the scan-out block to the encoder at the speed setting value.

In still another embodiment, a computer system includes a processor, and memory coupled to the processor and having stored therein instructions that, if executed by the computer system, cause the computer system to execute a method for cloud gaming. The method including generating a video frame when executing a video game at a server, wherein the video frame is stored in a frame buffer. The method including determining a maximum pixel clock for a chip-set including a scan-out block. The method including determining a frame rate setting based on the maximum pixel clock and an image size of a target display of a client. The method including determining a speed setting value for the chip-set. The method including scanning the video frame into the scan-out block from the frame buffer. The method including scanning-out the video frame from the scan-out block to the encoder at the speed setting value.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 5A-2 illustrates a chip set 540B that is configured for performing high speed scan-out operations for delivery to an encoder when streaming content from a video game executing at a cloud gaming server across a network, wherein user interface features are integrated into game rendered video frames, in accordance with one embodiment of the present disclosure.

FIGS. 5B-1, 5B-2, and 5B-3 illustrates scan-out operations being performed to generate modified video frames for delivery to an encoder when streaming content from a video game executing at a cloud gaming server across a network to a client, in accordance with one embodiment of the present disclosure.

DETAILED DESCRIPTION

Figure 1A:
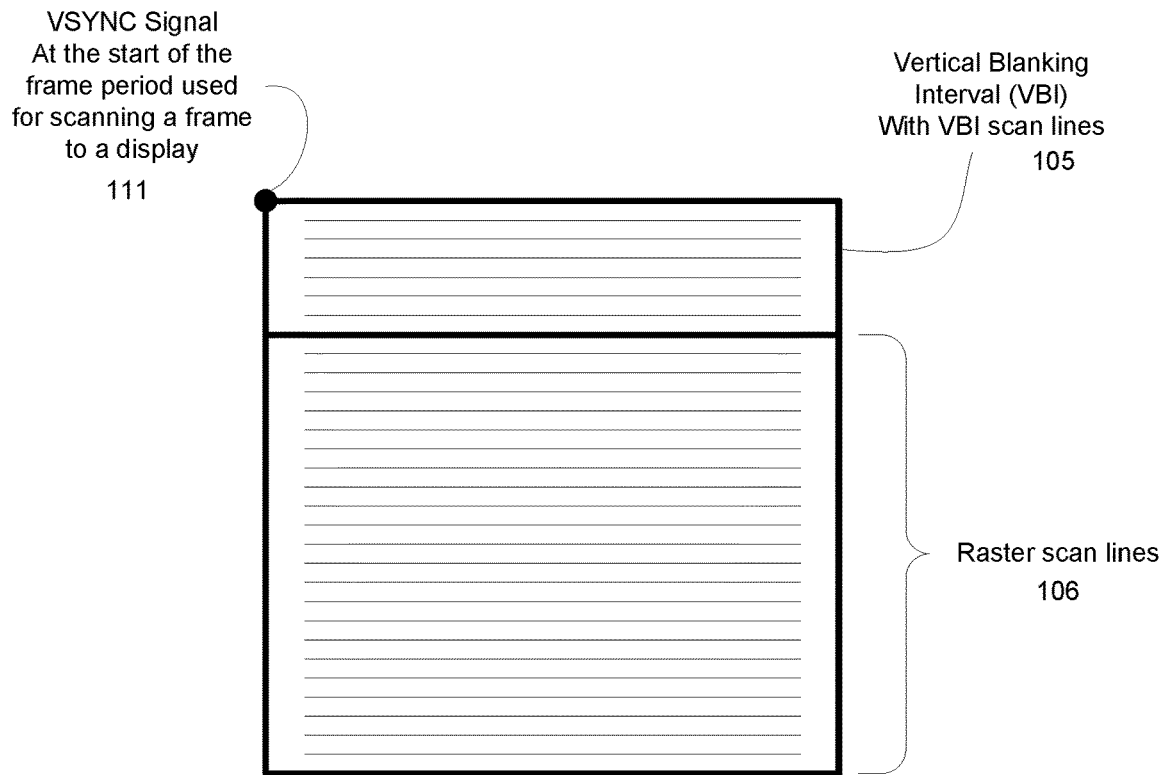
FIG. 1A is a diagram of a VSYNC signal at the beginning of a frame period, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems configured to reduce latency and/or latency instability between source and target devices when streaming media content (e.g., streaming audio and video from video games). Latency instability may be introduced in the one-way latency between a server and client due to the additional time needed to generate a complex frame (e.g., scene change) at the server, increased times to encode/compress the complex frame at the server, variable communication paths over a network, and increased time to decode complex frames at the client. Latency instability may also be introduced due to differences in clocks at the server and the client, which causes a drift between server and client VSYNC signals. In embodiments of the present disclosure, one-way latency between the server and client can be reduced in cloud gaming applications by performing high speed scan-out of the cloud gaming display buffers. In still another embodiment, one-way latency may be reduced by performing early scan-out of the cloud gaming display buffer. In another embodiment, when addressing latency issues, smoothness of client display of video in cloud gaming applications may be improved with the transmission of ideal display times to the client.

In particular, in some embodiments of the present disclosure, one-way latency in cloud gaming applications may be reduced by beginning the encode process earlier. For example, in certain architectures used for streaming media content (e.g., streaming audio and video from video games) from a cloud gaming server to a client, scan-out of server display buffer(s) include performing additional operations on video frames to generate one or more layers that are then combined and scanned to a unit that performs video encode. By performing scan-out at high speed (120 Hz or even higher), it is possible to begin the encode process earlier and therefore reduce one-way latency. Also, in some embodiments of the present disclosure, one-way latency in cloud gaming applications may be reduced by performing an early scan-out process at the cloud gaming server. In particular, in certain architectures used for streaming media content (e.g., streaming audio and video from video games) from a cloud gaming server to a client, the application program (e.g., video game) running on the server requests a "flip" of the server display buffer to occur when rendering a video frame is complete. Instead of performing scan-out operations on the subsequent occurrence of a server VSYNC signal, the scan-out operations begin at flip time, wherein the scan-out of server display buffer(s) include performing additional operations on video frames to generate one or more layers that are then combined and scanned to a unit that performs video encode. By scanning out at flip time (rather than the next VSYNC), it is possible to begin the encode process earlier and therefore reduce one-way latency. Because no display is actually attached to the cloud gaming server, display timing is unaffected. In some embodiments of the present disclosure, when performing server scan-out of the display buffer at flip time (rather than the subsequent VSYNC), ideal display timing at the client depends on both the time at which scan-out occurred and the game's intent with regards to that specific display buffer (e.g. was it targeted at the next VSYNC, or was the game running late and it was actually targeted at the previous VSYNC). Strategies differ by whether the game is fixed frame rate or variable frame rate, and whether the information will be implicit (inferred from scan-out timing) or explicit (game is providing ideal timing via the GPU API, which could be a VSYNC or a fractional time).

With the above general understanding of the various embodiments, example details of the embodiments will now be described with reference to the various drawings.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Cloud gaming includes the execution of a video game at the server to generate game rendered video frames, which are then sent to a client for display. Timing of operations at both the server and the client may be tied to respective vertical synchronization (VSYNC) parameters. When VSYNC signals are properly synchronized and/or offset between the server and/or the client, the operations performed at the server (e.g., generation and transmission of video frames over one or more frame periods) are synchronized with the operations performed at the client (e.g., displaying the video frames on a display at a display frame or refresh rate corresponding to the frame period). In particular, a server VSYNC signal generated at the server and a client VSYNC signal generated at the client may be used for synchronizing operations at the server and client. That is, when server and client VSYNC signals are synchronized and/or offset, the server generates and sends video frames in synchronization with how the client displays those video frames.

VSYNC signaling and vertical blanking intervals (VBI) have been incorporated for generating video frames and displaying those video frames when streaming media content between a server and a client. For example, the server strives to generate a game rendered video frame in one or several frame periods as defined by a corresponding server VSYNC signal (e.g. if a frame period of 16.7 ms, then generating a video frame each frame period results in 60 Hz operation, and generating one video frame for each two frame periods results in 30 Hz operation), and subsequently encode and transmit that video frame to the client. At the client, the received encoded video frames are decoded and displayed, wherein the client displays each video frame that is rendered for display beginning with a corresponding client VSYNC.

Figure 1B:
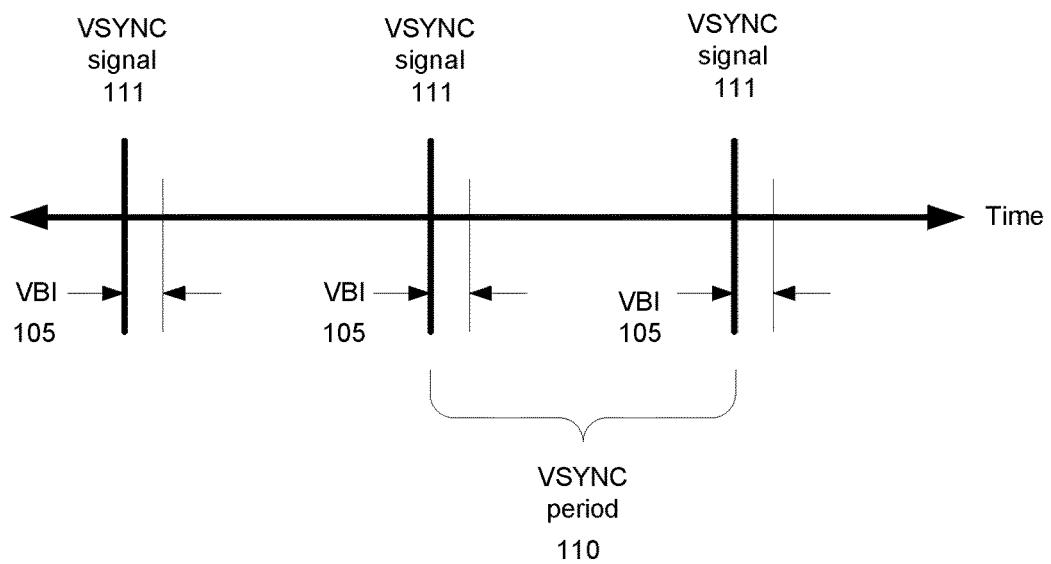
FIG. 1B is a diagram of the frequency of a VSYNC signal, in accordance with one embodiment of the present disclosure.

For illustration, FIG. 1A shows how a VSYNC signal 111 may indicate the beginning of a frame period, wherein various operations may be performed during a corresponding frame period at the server and/or client. When streaming media content, the server may use a server VSYNC signal for generating and encoding video frames, and the client may use a client VSYNC signal for displaying the video frames. The VSYNC signal 111 is generated at a defined frequency which corresponds to the defined frame period 110, as shown in FIG. 1B. In addition, VBI 105 defines the time period between when the last raster line was drawn on the display for a previous frame period and when the first raster line (e.g., top) is drawn to the display. As shown, after VBI 105, the video frame rendered for display is displayed via raster scanlines 106 (e.g., raster line by raster line, from left to right).

In addition, various embodiments of the present disclosure are disclosed for reducing one-way latency and/or latency instability between source and target devices, such as when streaming media content (e.g., video game content). For purposes of illustration only, the various embodiments for reducing one-way latency and/or latency instability are described within a server and client network configuration. However, it is understood that the various techniques disclosed for reducing one-way latency and/or latency instability may be implemented within other network configurations, and/or over peer-to-peer networks, as is shown in FIGS. 2A-2D. For example, the various embodiments disclosed for reducing one-way latency and/or latency instability may be implemented between one or more of server and client devices in various configurations (e.g., server and client, server and server, server and multiple clients, server and multiple servers, client and client, client and multiple clients, etc.).

Figure 2A:
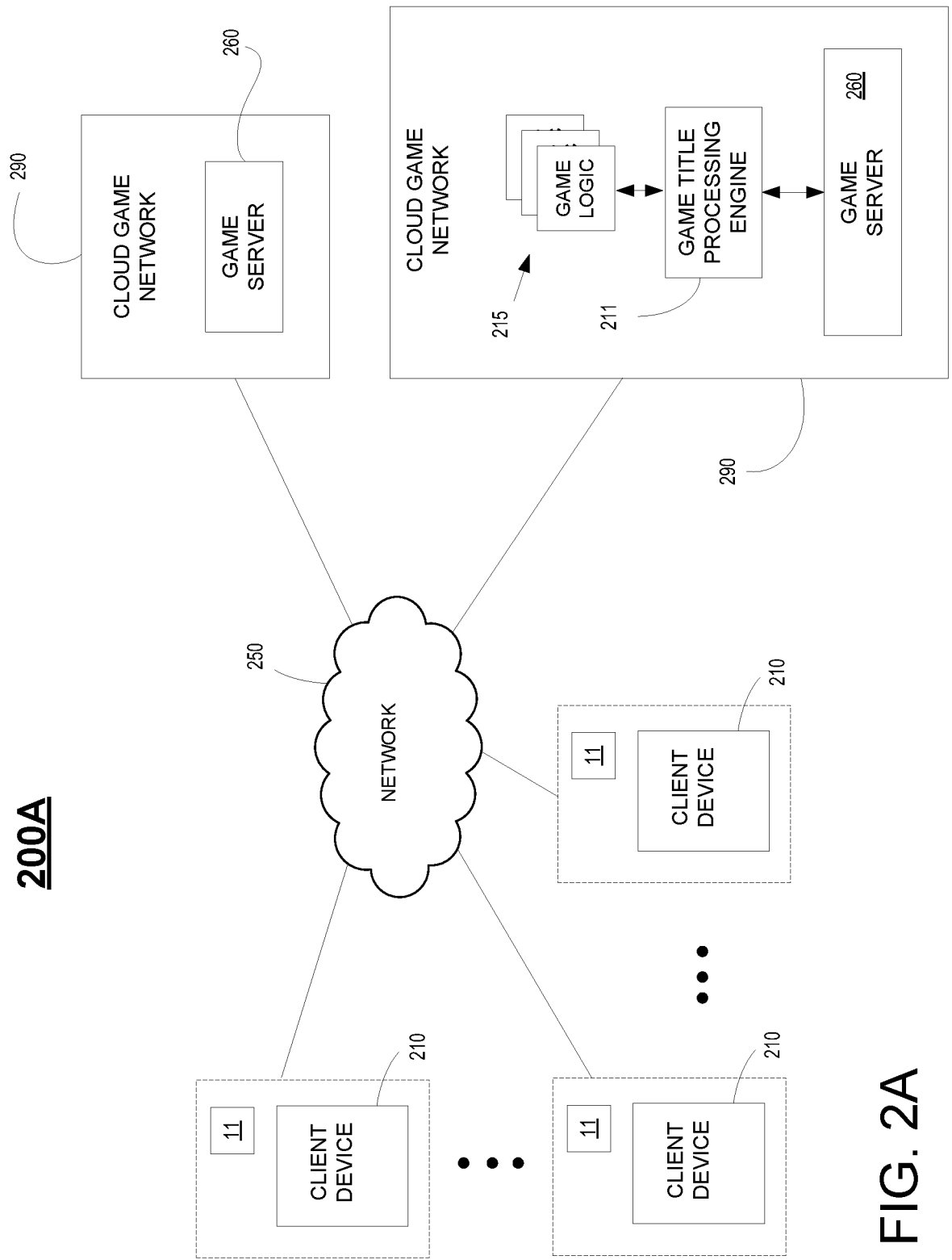
FIG. 2A is a diagram of a system for providing gaming over a network between one or more cloud gaming servers, and one or more client devices, in various configurations, wherein VSYNC signals can be synchronized and offset to reduce one-way latency, in accordance with one embodiment of the present disclosure.

FIG. 2A is a diagram of a system 200A for providing gaming over a network 250 between one or more cloud gaming networks 290 and/or servers 260, and one or more client devices 210, in various configurations, wherein server and client VSYNC signals can be synchronized and offset, and/or wherein dynamic buffering is performed on the client, and/or wherein encode and transmit operations on the server can be overlapped, and/or wherein receive and decode operations at the client can be overlapped, and/or wherein decode and display operations on the client can be overlapped to reduce one-way latency between the server 260 and client 210, in accordance with one embodiment of the present disclosure. In particular, system 200A provides gaming via a cloud game network 290, wherein the game is being executed remote from client device 210 (e.g., thin client) of a corresponding user that is playing the game, in accordance with one embodiment of the present disclosure. System 200A may provide gaming control to one or more users playing one or more games through the cloud game network 290 via network 250 in either single-player or multi-player modes. In some embodiments, the cloud game network 290 may include a plurality of virtual machines (VMs) running on a hypervisor of a host machine, with one or more virtual machines configured to execute a game processor module utilizing the hardware resources available to the hypervisor of the host. Network 250 may include one or more communication technologies. In some embodiments, network 250 may include 5th Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 290 includes a game server 260 that provides access to a plurality of video games. Game server 260 may be any type of server computing device available in the cloud, and may be configured as one or more virtual machines executing on one or more hosts. For example, game server 260 may manage a virtual machine supporting a game processor that instantiates an instance of a game for a user. As such, a plurality of game processors of game server 260 associated with a plurality of virtual machines is configured to execute multiple instances of one or more games associated with gameplays of a plurality of users. In that manner, back-end server support provides streaming of media (e.g., video, audio, etc.) of gameplays of a plurality of gaming applications to a plurality of corresponding users. That is, game server 260 is configured to stream data (e.g., rendered images and/or frames of a corresponding gameplay) back to a corresponding client device 210 through network 250. In that manner, a computationally complex gaming application may be executing at the back-end server in response to controller inputs received and forwarded by client device 210. Each server is able to render images and/or frames that are then encoded (e.g., compressed) and streamed to the corresponding client device for display For example, a plurality of users may access cloud game network 290 via communications network 250 using corresponding client devices 210 configured for receiving streaming media. In one embodiment, client device 210 may be configured as a thin client providing interfacing with a back end server (e.g., game server 260 of cloud game network 290) configured for providing computational functionality (e.g., including game title processing engine 211). In another embodiment, client device 210 may be configured with a game title processing engine and game logic for at least some local processing of a video game, and may be further utilized for receiving streaming content as generated by the video game executing at a back end server, or for other content provided by back end server support. For local processing, the game title processing engine includes basic processor based functions for executing a video game and services associated with the video game. The game logic is stored on the local client device 210 and is used for executing the video game.

In particular, client device 210 of a corresponding user (not shown) is configured for requesting access to games over a communications network 250, such as the internet, and for rendering for display images generated by a video game executed by the game server 260, wherein encoded images are delivered to the client device 210 for display in association with the corresponding user. For example, the user may be interacting through client device 210 with an instance of a video game executing on game processor of game server 260. More particularly, an instance of the video game is executed by the game title processing engine 211. Corresponding game logic (e.g., executable code) 215 implementing the video game is stored and accessible through a data store (not shown), and is used to execute the video game. Game title processing engine 211 is able to support a plurality of video games using a plurality of game logics, each of which is selectable by the user.

For example, client device 210 is configured to interact with the game title processing engine 211 in association with the gameplay of a corresponding user, such as through input commands that are used to drive gameplay. In particular, client device 210 may receive input from various types of input devices, such as game controllers, tablet computers, keyboards, gestures captured by video cameras, mice, touch pads, etc. Client device 210 can be any type of computing device having at least a memory and a processor module that is capable of connecting to the game server 260 over network 250. The back-end game title processing engine 211 is configured for generating rendered images, which is delivered over network 250 for display at a corresponding display in association with client device 210. For example, through cloud based services the game rendered images may be delivered by an instance of a corresponding game executing on game executing engine 211 of game server 260. That is, client device 210 is configured for receiving encoded images (e.g., encoded from game rendered images generated through execution of a video game), and for displaying the images that are rendered for display 11. In one embodiment, display 11 includes an HMD (e.g., displaying VR content). In some embodiments, the rendered images may be streamed to a smartphone or tablet, wirelessly or wired, direct from the cloud based services or via the client device 210 (e.g., PlayStation® Remote Play).

In one embodiment, game server 260 and/or the game title processing engine 211 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

In one embodiment, cloud game network 290 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 290, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

The game title processing engine 211 includes a central processing unit (CPU) and graphics processing unit (GPU) group that may be configured to perform multi-tenancy GPU functionality. In another embodiment, multiple GPU devices are combined to perform graphics processing for a single application that is executing on a corresponding CPU.

Figure 2B:
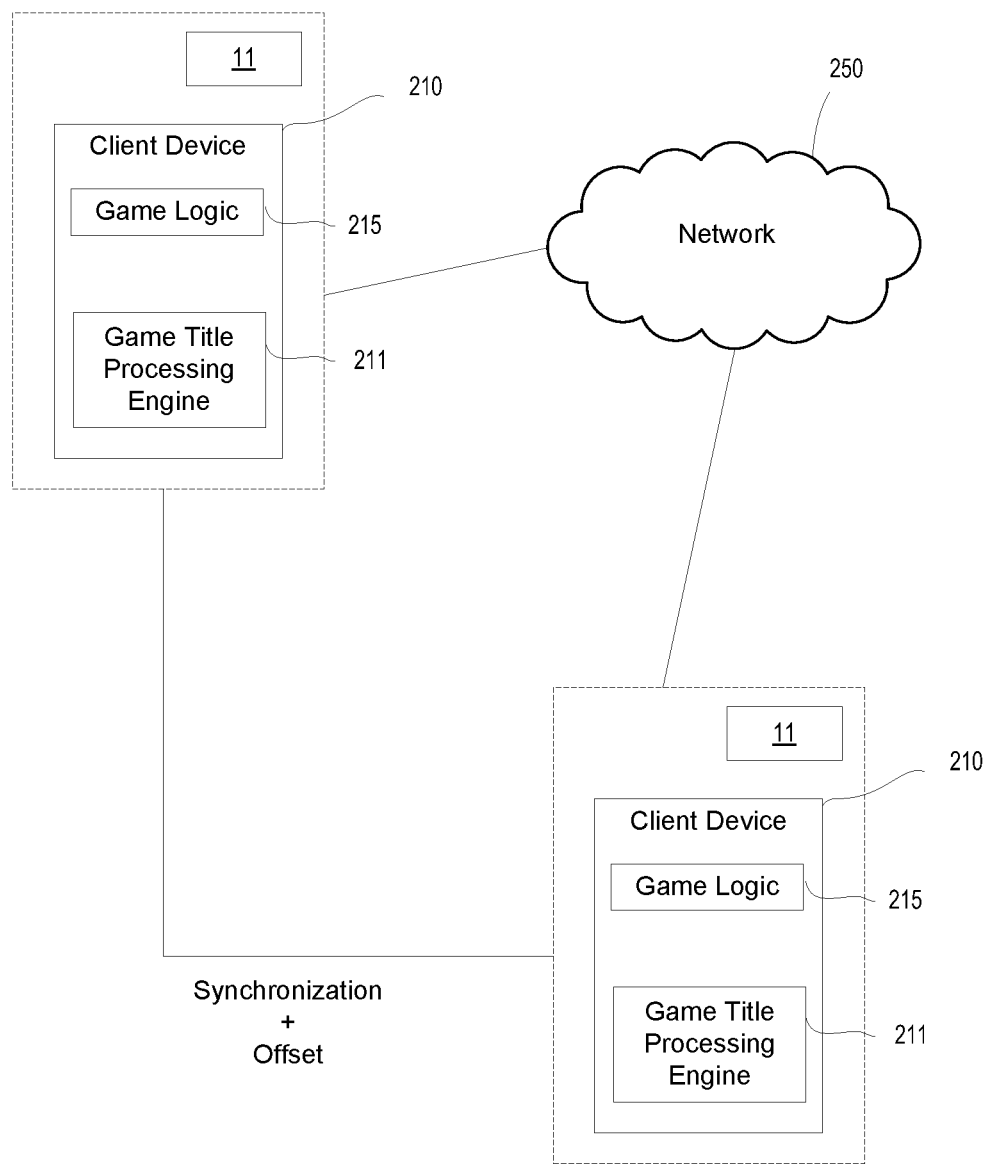
FIG. 2B is a diagram for providing gaming between two or more peer devices, wherein VSYNC signals can be synchronized and offset to achieve optimal timing of receipt of controller and other information between the devices, in accordance with one embodiment of the present disclosure.

FIG. 2B is a diagram for providing gaming between two or more peer devices, wherein VSYNC signals can be synchronized and offset to achieve optimal timing of receipt of controller and other information between the devices, in accordance with one embodiment of the present disclosure. For example, head-to-head gaming may be performed using two or more peer devices that are connected through network 250 or directly through peer-to-peer communication (e.g., Bluetooth, local area networking, etc.).

As shown, a game is being executed locally on each of the client devices 210 (e.g., game console) of corresponding users that are playing the video game, wherein the client devices 210 communicate through peer-to-peer networking. For example, an instance of a video game is executing by the game title processing engine 211 of a corresponding client device 210. Game logic 215 (e.g., executable code) implementing the video game is stored on the corresponding client device 210, and is used to execute the game. For purposes of illustration, game logic 215 may be delivered to the corresponding client device 210 through a portable medium (e.g. optical media) or through a network (e.g., downloaded through the internet from a gaming provider).

In one embodiment, the game title processing engine 211 of a corresponding client device 210 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

Client device 210 may receive input from various types of input devices, such as game controllers, tablet computers, keyboards, gestures captured by video cameras, mice, touch pads, etc. Client device 210 can be any type of computing device having at least a memory and a processor module, and is configured for generating rendered images executed by the game title processing engine 211, and for displaying the rendered images on a display (e.g., display 11, or display 11 including a head mounted display—HMD, etc.). For example, the rendered images may be associated with an instance of the game executing locally on client device 210 to implement gameplay of a corresponding user, such as through input commands that are used to drive gameplay. Some examples of client device 210 include a personal computer (PC), a game console, a home theater device, a general purpose computer, mobile computing device, a tablet, a phone, or any other types of computing devices that can execute an instance of a game.

Figure 2C:
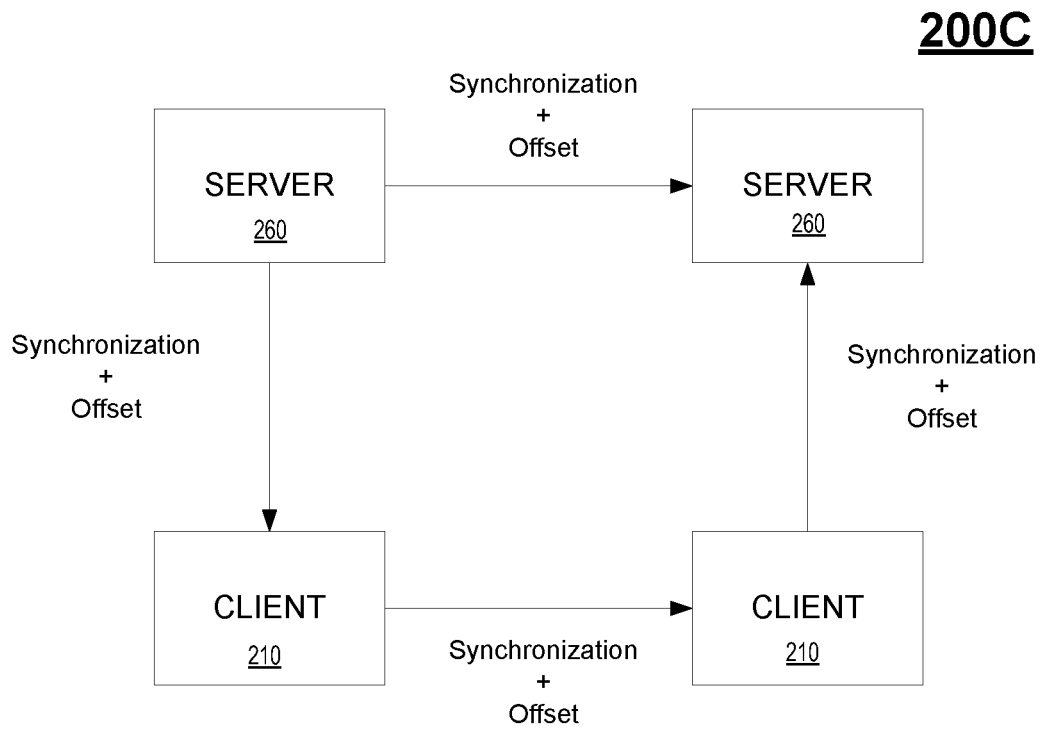
FIG. 2C illustrates various network configurations that benefit from proper synchronization and offsetting of VSYNC signals between a source device and a target device, in accordance with one embodiment of the present disclosure.

FIG. 2C illustrates various network configurations that benefit from proper synchronization and offsetting of VSYNC signals between a source device and a target device, including those configurations shown in FIGS. 2A-2B, in accordance with embodiments of the present disclosure. In particular, the various network configurations benefit from proper alignment of frequencies of server and client VSYNC signals, and a timing offset of the server and client VSYNC signals for purposes of reducing one-way latency and/or latency variability between a server and client. For example, one network device configuration includes a cloud gaming server (e.g., source) to client (target) configuration. In one embodiment, the client may include a WebRTC client configured for providing audio and video communication inside a web browser. Another network configuration includes a client (e.g. source) to server (target) configuration. Still another network configuration includes a server (e.g., source) to server (e.g., target) configuration. Another network device configuration includes a client (e.g., source) to client (target) configuration, wherein the clients can each be a gaming console to provide for head-to-head gaming, for example.

In particular, alignment of VSYNC signals may include synchronizing the frequencies of the server VSYNC signal and the client VSYNC signal, and may also include adjusting a timing offset between the client VSYNC signal and server VSYNC signal, for the purposes of removing drift, and/or to maintain an ideal relationship between server and client VSYNC signals, for purposes of reducing one-way latency and/or latency variability. To achieve proper alignment, the server VSYNC signal may be tuned in order to implement proper alignment between a server 260 and client 210 pair, in one embodiment. In another embodiment, the client VSYNC signal may be tuned in order to implement proper alignment between a server 260 and client 210 pair. Once the client and server VSYNC signals are aligned, the server VSYNC signal and client VSYNC signal occur at substantially the same frequency, and are offset from each other by a timing offset, that may be adjusted from time to time. In another embodiment, alignment of VSYNC signals may include synchronizing the frequencies of VSYNC for two clients, and may also include adjusting a timing offset between their VSYNC signals, for the purposes of removing drift, and/or achieving optimal timing of receipt of controller and other information; either VSYNC signal may be tuned to achieve this alignment. In still another embodiment, alignment may include synchronizing the frequencies of VSYNC for a plurality of servers, and may also include synchronizing the frequencies of the server VSYNC signals and the client VSYNC signals and adjusting a timing offset between the client VSYNC and server VSYNC signals, e.g. for head-to-head cloud gaming. In the server to client configuration and the client to client configuration, alignment may include both synchronization of the frequencies between the server VSYNC signal and client VSYNC signal, as well as providing a proper timing offset between the server VSYNC signal and client VSYNC signal. In the server to server configuration, alignment may include synchronization of the frequencies between the server VSYNC signal and client VSYNC signal without setting a timing offset.

Figure 2D:
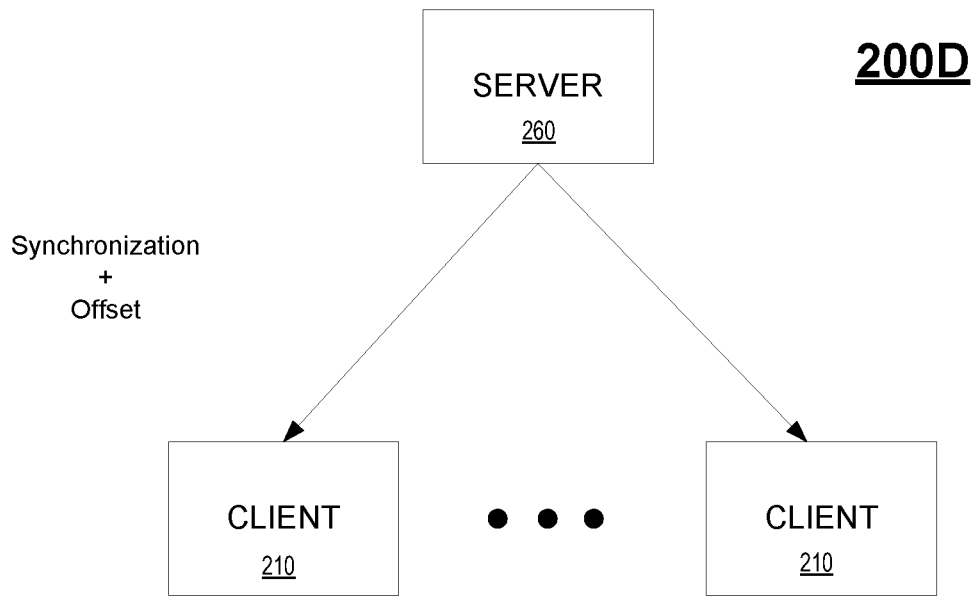
FIG. 2D illustrates a multi-tenancy configuration between a cloud gaming server and multiple clients that benefit from proper synchronization and offsetting of VSYNC signals between a source device and a target device, in accordance with one embodiment of the present disclosure.

FIG. 2D illustrates a multi-tenancy configuration between a cloud gaming server 260 and one or more clients 210 that benefit from proper synchronization and offsetting of VSYNC signals between a source device and a target device, in accordance with one embodiment of the present disclosure. In the server to client configuration, alignment may include both synchronization of the frequencies between the server VSYNC signal and client VSYNC signal, as well as providing a proper timing offset between the server VSYNC signal and client VSYNC signal. In the multi-tenancy configuration, the client VSYNC signal is tuned at each client 210 in order to implement proper alignment between a server 260 and client 210 pair, in one embodiment.

For example, a graphics subsystem may be configured to perform multi-tenancy GPU functionality, wherein one graphics subsystem could be implementing graphics and/or rendering pipelines for multiple games, in one embodiment. That is, the graphics subsystem is shared between multiple games that are being executed. In particular, a game title processing engine may include a CPU and GPU group that may be configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices. In another embodiment, multiple GPU devices are combined to perform graphics processing for a single application that is executing on a corresponding CPU.

Figure 3:
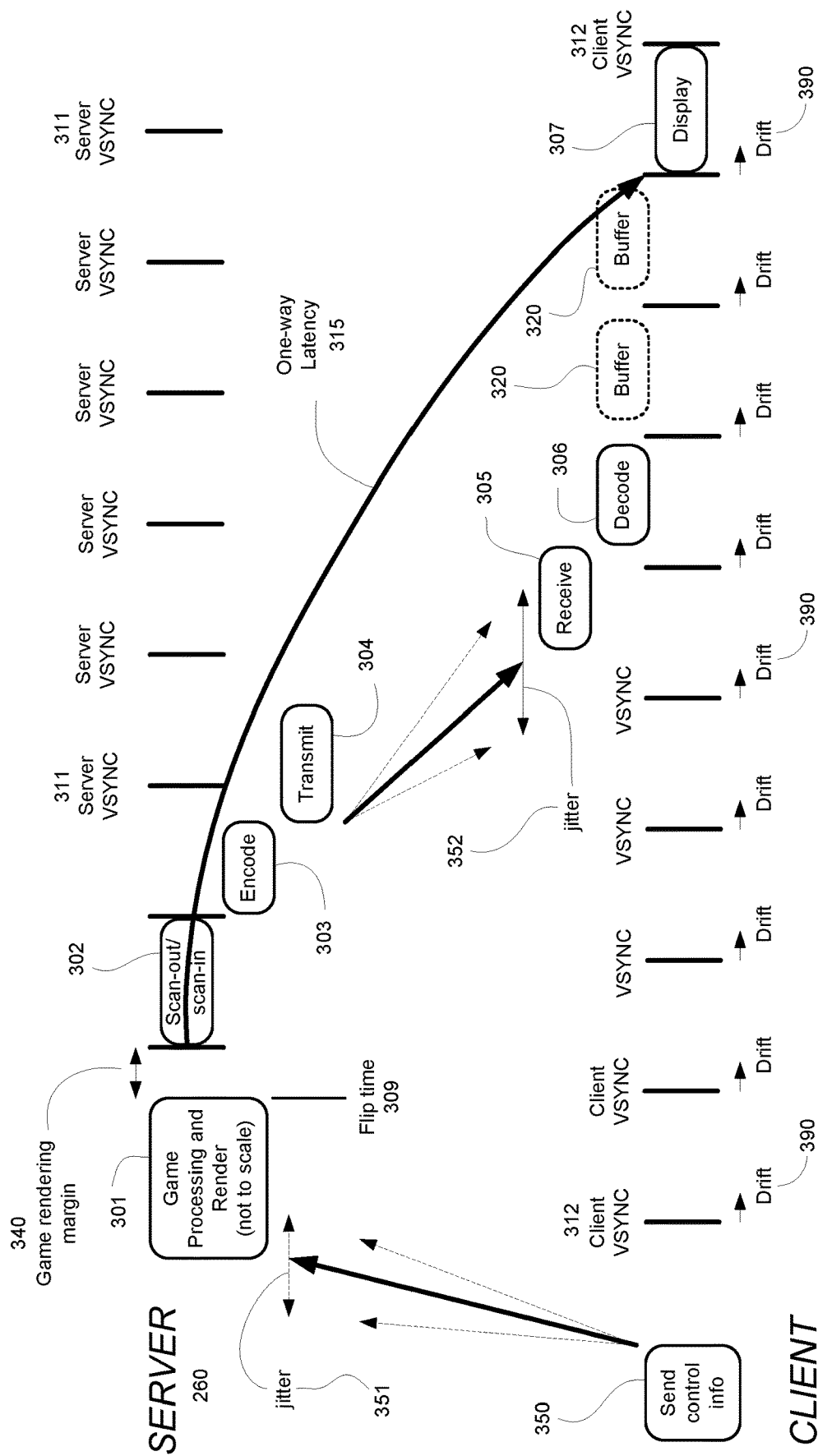
FIG. 3 illustrates the variation in one-way latency between a cloud gaming server and a client due to clock drift when streaming video frames generated from a video game executing on the server, in accordance with one embodiment of the present disclosure.

FIG. 3 illustrates the general process of executing a video game at a server to generate game rendered video frames and sending those video frames to a client for display. Traditionally, a number of the operations at the game server 260 and client 210 are performed within a frame period as defined by a respective VSYNC signal. For example, the server 260 strives to generate a game rendered video frame at 301 in one or multiple frame periods as defined by a corresponding server VSYNC signal 311. The video frame is generated by the game, either in response to control information (e.g., input commands of a user) delivered from an input device at operation 350, or game logic not driven by control information. Transmission jitter 351 may be present when sending control information to the server 260, wherein jitter 351 measures the variation of network latency from client to server (e.g., when sending input commands). As shown, the bold arrow shows the current delay when sending control information to the server 260, but due to jitter there may be a range of arrival times for control information at the server 260 (e.g. range bounded by the dotted arrows). At flip-time 309, the GPU reaches a flip command that indicates that the corresponding video frame has been completely generated and placed into the frame buffer at the server 260. Thereafter, the server 260 performs scan-out/scan-in (operation 302), wherein scan-out may be aligned with the VSYNC signal 311) for that video frame over the subsequent frame period as defined by the server VSYNC signal 311 (the VBI is omitted for clarity). Subsequently the video frame is encoded (operation 303) (e.g. encoding starts after an occurrence of the VSYNC signal 311, and the end of encoding may not be aligned with the VSYNC signal) and transmitted (operation 304, wherein transmission may not be aligned with the VSYNC signal 311) to the client 210. At the client 210, the encoded video frames are received (operation 305, wherein receive may not be aligned with the client VSYNC signal 312), decoded (operation 306, wherein decode may not be aligned with the client VSYNC signal 312), buffered, and displayed (operation 307, wherein the start of display may be aligned with the client VSYNC signal 312). In particular, the client 210 displays each video frame that is rendered for display beginning with a corresponding occurrence of the client VSYNC signal 312.

One-way latency 315 may be defined as being the latency from beginning of transfer of the video frame to the encoding unit (e.g. scan-out 302) at the server, to the beginning of display of the video frame at the client 307. That is, one-way latency is the time from server scan-out to client display, taking into account client buffering. Individual frames have a latency from beginning of scan-out 302 to completion of decode 306 that may vary from frame to frame due to the high degree of variance of server operations such as encode 303 and transmission 304, network transmission between the server 260 and client 210 with accompanying jitter 352, and client reception 305. As shown, the straight bold arrow shows the current latency when sending the corresponding video frame to the client 210, but due to jitter 352 there may be a range of arrival times for video frames at the client 210 (e.g. range bounded by the dotted arrows). As one-way latency must be relatively stable (e.g. kept fairly consistent) to achieve a good play experience, traditionally buffering 320 is performed with the result that the display of individual frames with low latency (e.g. from beginning of scan-out 302 to completion of decode 306) is delayed for several frame periods. That is, if there are network instabilities, or unpredictable encode/decode time, extra buffering is needed so that one-way latency is kept consistent.

One-way latency between a cloud gaming server and a client may vary due to clock drift when streaming video frames generated from a video game executing on the server, in accordance with one embodiment of the present disclosure. That is, differences in the frequencies of the server VSYNC signal 311 and the client VSYNC signal 312 may cause the client VSYNC signal to drift relative to the frames arriving from the server 260. The drift may be due to very slight differences in the crystal oscillators used in each of the respective clocks at the server and client. Furthermore, embodiments of the present disclosure reduce one-way latency by performing one or more of synchronization and offset of VSYNC signals for alignment between a server and a client, by providing dynamic buffering on the client, by overlapping encode and transmit of video frames at the server, by overlapping receive and decode of video frames at the client, and by overlapping decoding and displaying of video frames at the client.

Figure 4:
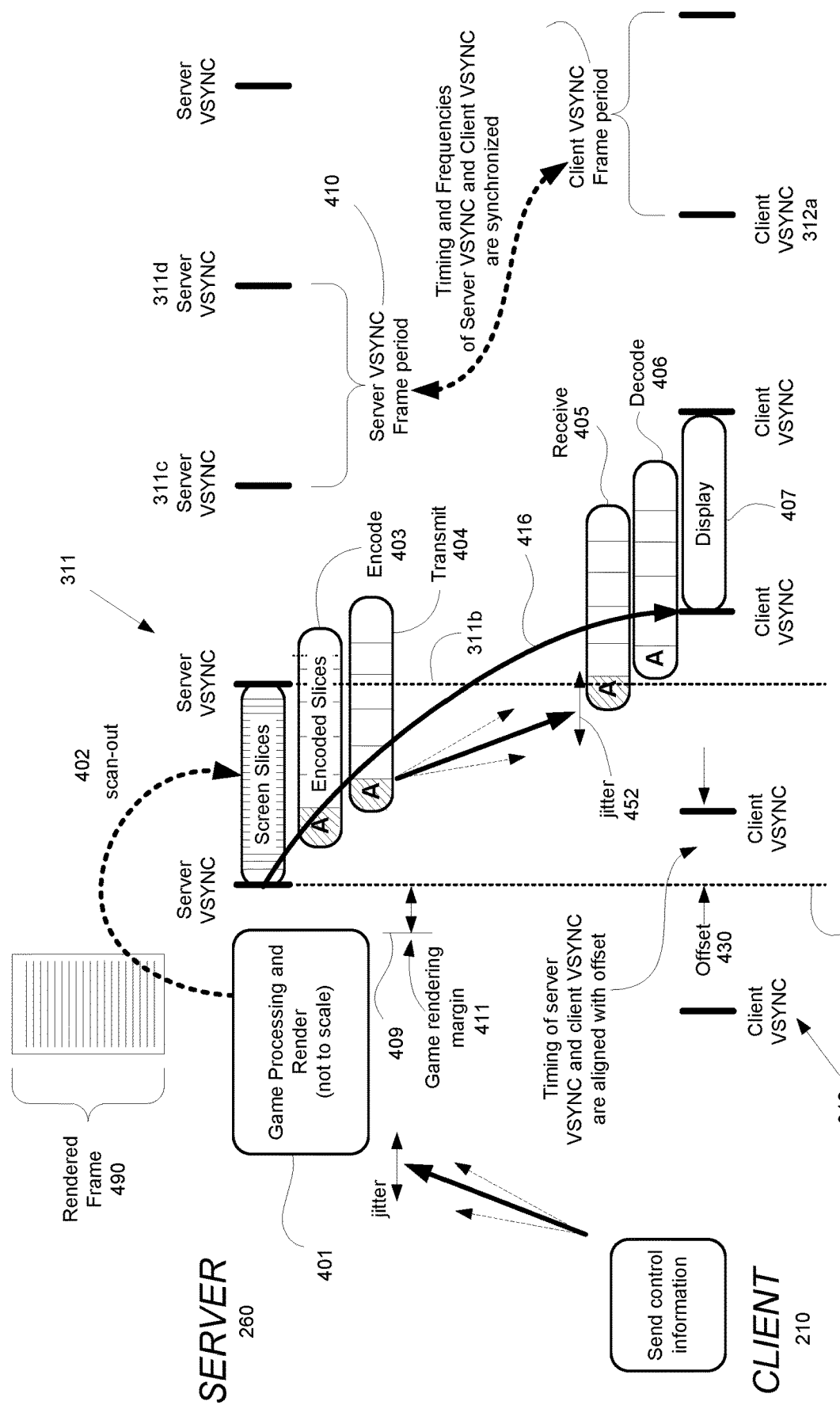
FIG. 4 illustrates a network configuration including a cloud gaming server and a client when streaming video frames generated from a video game executing on the server, the VSYNC signals between the server and the client being synchronized and offset to allow for overlapping of operations at the server and client, and to reduce one-way latency between the server and the client.

FIG. 4 illustrates the flow of data through a network configuration including a highly optimized cloud gaming server 260 and a highly optimized client 210 when streaming video frames generated from a video game executing on the server, wherein overlapping server operations and client operations reduces the one-way latency, and synchronizing and offsetting the VSYNC signals between the server and the client reduces the one-way latency as well as reduces variability in the one-way latency between the server and the client, in accordance with embodiments of the present disclosure. In particular, FIG. 4 shows the desired alignment between the server and the client VSYNC signals. In one embodiment, tuning of the server VSYNC signal 311 is performed to obtain proper alignment between server and client VSYNC signals, such as in a server and client network configuration. In another embodiment, tuning of the client VSYNC signal 312 is performed to obtain proper alignment between server and client VSYNC signals, such as in a multi-tenant server to multiple clients network configuration. For purposes of illustration, tuning of the server VSYNC signal 311 is described in FIG. 4 for purposes of synchronizing the frequencies of server and client VSYNC signals, and/or adjusting the timing offset between corresponding client and server VSYNC signals, though it is understood that the client VSYNC signal 312 may also be used for tuning. In the context of this patent, "synchronize" should be taken to mean tuning the signals so that their frequencies match, but phase may differ; "offset" should be taken to mean the time delay between the signals, e.g. the time between when one signal reaches its maximum and the other signal reaches its maximum.

As shown, FIG. 4 illustrates an improved process of executing a video game at a server to generate rendered video frames and sending those video frames to a client for display, in embodiments of the present disclosure. The process is shown with respect to generation and display of a single video frame at a server and client. In particular, the server generates a game rendered video frame at 401. For example, the server 260 includes a CPU (e.g., game title processing engine 211) configured for executing the game. The CPU generates one or more draw calls for a video frame, wherein the draw calls include commands placed into a command buffer for execution by a corresponding GPU of the server 260 in a graphics pipeline. The graphics pipeline may include one or more shader programs operating on vertices of objects within a scene to generate texture values as rendered for the video frame for displaying, wherein the operations are performed in parallel through a GPU for efficiency. At flip-time 409, the GPU reaches a flip command in the command buffer that indicates that the corresponding video frame has been completely generated and/or rendered and placed into the frame buffer at the server 260.

At 402, the server performs scan-out of the game rendered video frame to an encoder. In particular, scan-out is performed scanline by scanline, or in groups of consecutive scanlines, wherein a scanline refers to a single horizontal line, for example of a display from screen edge to screen edge. These scanlines or groups of consecutive scanlines are sometimes referred to as slices, and are referred to in this specification as screen slices. In particular, scan-out 402 may include a number of processes that modify the game rendered frame, including overlaying it with another frame buffer, or shrinking it in order to surround it with information from another frame buffer. During scan-out 402, the modified video frame is then scanned into an encoder for compression. In one embodiment, scan-out 402 is performed at an occurrence 311a of the VSYNC signal 311. In other embodiments, scan-out 402 may be performed before the occurrence of the VSYNC signal 311, such as at flip-time 409.

At 403, the game rendered video frame (which may have undergone modification) is encoded on an encoder slice by encoder slice basis at the encoder to generate one or more encoded slices, wherein an encoded slice is unrelated to a scanline or screen slice. As such, the encoder generates one or more encoded (e.g., compressed) slices. In one embodiment, the encoding process begins before the scan-out 402 process has fully completed for a corresponding video frame. Further, the start and/or end of encode 403 may or may not be aligned with the server VSYNC signal 311. The boundaries of an encoded slice are not restricted to a single scanline, and may be comprised of a single scanline, or multiple scanlines. Additionally, the end of an encoded slice and/or the start of the next encoder slice may not necessarily occur at the edges of the display screen (e.g., may occur somewhere mid-screen or in the middle of a scanline), such that the encoded slice need not traverse fully from edge to edge of the display screen. As shown, one or more encoded slices may be compressed and/or encoded, including "encoded slice A" that is compressed having hash marks.

At 404, the encoded video frame is transmitted from the server to the client, wherein the transmission may occur on an encoded slice-by-slice basis, wherein each encoded slice is an encoder slice that has been compressed. In one embodiment, the transmission process 404 begins before the encoding process 403 has fully completed for a corresponding video frame. Further, the start and/or end of transmission 404 may or may not be aligned with the server VSYNC signal 311. As shown, encoded slice A that is compressed is transmitted to the client independently of the other compressed encoder slices for the rendered video frame. The encoder slices may be transmitted one at a time, or in parallel.

At 405, the client receives the compressed video frame, again on an encoded slice-by-slice basis. Further, the start and/or end of receive 405 may or may not be aligned with the client VSYNC signal 312. As shown, encoded Slice A that is compressed is received by the client. Transmission jitter 452 may be present between the server 260 and client 210, wherein jitter 452 measures the variation in network latency from the server 260 to the client 210. A lower jitter value exhibits a more stable connection. As shown, the bold straight arrow shows the current latency when sending the corresponding video frame to the client 210, but due to jitter there may be a range of arrival times for video frames at the client 210 (e.g. range bounded by the dotted arrows). Variation in latency may also be due to one or more operations at the server such as encode 403 and transmission 404, as well as networking issues that introduce latency when transmitting video frames to the client 210.

At 406, the client decodes the compressed video frame, again on an encoded slice-by-slice basis, producing decoded Slice A (shown without hash marks) that is now ready for display. In one embodiment, the decode process 406 begins before the receive process 405 has fully completed for a corresponding video frame. Further, the start and/or end of decode 406 may or may not be aligned with the client VSYNC signal 312. At 407, the client displays the decoded rendered video frame on the display at the client. That is, the decoded video frame is placed in a display buffer which is streamed out on a scanline-by-scanline basis to a display device, for example. In one embodiment, the display process 407 (i.e. the streaming out to the display device) begins after the decode process 406 has fully completed for a corresponding video frame, i.e. the decoded video frame is fully resident in the display buffer. In another embodiment, the display process 407 begins before the decode process 406 has fully completed for a corresponding video frame. That is, streamout to the display device begins from the address of the display buffer at a time at which only a portion of the decoded frame buffer is resident in the display buffer. The display buffer is then updated or filled in with remaining portions of the corresponding video frame in time for displaying, such that the updating of the display buffer is performed prior to streamout of those portions to the display. Further, the start and/or end of display 407 is aligned with the client VSYNC signal 312.

In one embodiment, the one-way latency 416 between the server 260 and the client 210 may be defined as the elapsed time between when scan-out 402 begins and when display 407 begins. Embodiments of the present disclosure are capable of aligning the VSYNC signals (e.g. synchronize the frequency and adjust the offset) between the server and the client, to reduce one-way latency between the server and the client, and to reduce variability in the one-way latency between the server and the client. For example, embodiments of the present disclosure are able to calculate an optimal adjustment to the offset 430 between server VSYNC signal 311 and client VSYNC signal 312 such that even in the event of near worst case time needed for server processing such as encode 403 and transmit 404, near worst case network latency between server 260 and client 210, and near worst case client processing such as receive 405 and decode 406, the decoded rendered video frame is available in time for the display process 407. That is, it is not necessary to determine the absolute offset between server VSYNC and client VSYNC; it is sufficient to adjust the offset so that the decoded rendered video frame is available in time for the display process.

In particular, the frequencies of the server VSYNC signal 311 and the client VSYNC signal 312 may be aligned through synchronization. Synchronization is achieved through tuning the server VSYNC signal 311 or the client VSYNC signal 312. For purposes of illustration, tuning is described in relation to the server VSYNC signal 311, though it is understood that tuning could be performed on the client VSYNC signal 312 instead. For example, as shown in FIG. 4 the server frame period 410 (e.g., the time between two occurrences 311c and 311d of the server VSYNC signal 311) is substantially equal to the client frame period 415 (e.g., the time between two occurrences 312a and 312b of the client VSYNC signal 312), which indicates that the frequencies of the server VSYNC signal 311 and client VSYNC signal 312 are also substantially equal.

To maintain synchronization of the frequencies of the server and client VSYNC signals, the timing of the server VSYNC signal 311 may be manipulated. For example, the vertical blanking interval (VBI) in the server VSYNC signal 311 may be increased or reduced over a period of time, such as to account for the drift between the server VSYNC signal 311 and the client VSYNC signal 312. Manipulation of vertical blanking (VBLANK) lines in the VBI provides for adjusting the number of scanlines used for VBLANK for one or more frame periods of the server VSYNC signal 311. Dropping the number of scanlines of VBLANK reduces a corresponding frame period (e.g., time interval) between two occurrences of the server VSYNC signal 311. Conversely, increasing the number of scanlines of VBLANK increases a corresponding frame period (e.g., time interval) between two occurrences of the VSYNC signal 311. In that manner, the frequency of the server VSYNC signal 311 is adjusted to align the frequencies between the client and server VSYNC signals 311 and 312 to be at substantially the same frequency. Also, offset between server and client VSYNC signals can be adjusted by increasing or reducing the VBI for a short period of time, before returning the VBI to its original value. In one embodiment, the server VBI is adjusted. In another embodiment, the client VBI is adjusted. In yet another embodiment, instead of two devices (server and client), there are a plurality of connected devices, each of which may have a corresponding VBI that is adjusted. In one embodiment, each of the plurality of connected devices may be independent peer devices (e.g. without a server device). In another embodiment, the plurality of devices may include one or more server devices and/or one or more client devices arranged in one or more server/client architectures, multi-tenant server/client(s) architecture, or some combination thereof.

Alternatively, the pixel clock of the server (e.g., located at the southbridge of a northbridge/southbridge core logic chipset of the server, or in the case of a discrete GPU, it would generate a pixel clock by itself using its own hardware) may be manipulated to perform coarse and/or fine tuning of the frequency of the server VSYNC signal 311 over a period of time to bring the synchronization of frequencies between server and client VSYNC signals 311 and 312 back into alignment, in one embodiment. Specifically, the pixel clock in the south bridge of the server may be overclocked or underclocked to adjust the overall frequency of the VSYNC signal 311 of the server. In that manner, the frequency of the server VSYNC signal 311 is adjusted to align the frequencies between the client and server VSYNC signals 311 and 312 to be at substantially the same frequency. Offset between server and client VSYNC can be adjusted by increasing or reducing the client server pixel clock for a short period of time, before returning the pixel clock to its original value. In one embodiment, the server pixel clock is adjusted. In another embodiment, the client pixel clock is adjusted. In yet another embodiment, instead of two devices (server and client), there are a plurality of connected devices, each of which may have a corresponding pixel clock which is adjusted. In one embodiment, each of the plurality of connected devices may be independent peer devices (e.g. without a server device). In another embodiment, the plurality of connected devices may include one or more server devices and one or more client devices arranged in one or more server/client architectures, multi-tenant server/client(s) architecture, or some combination thereof.

Figures 1, 5A:
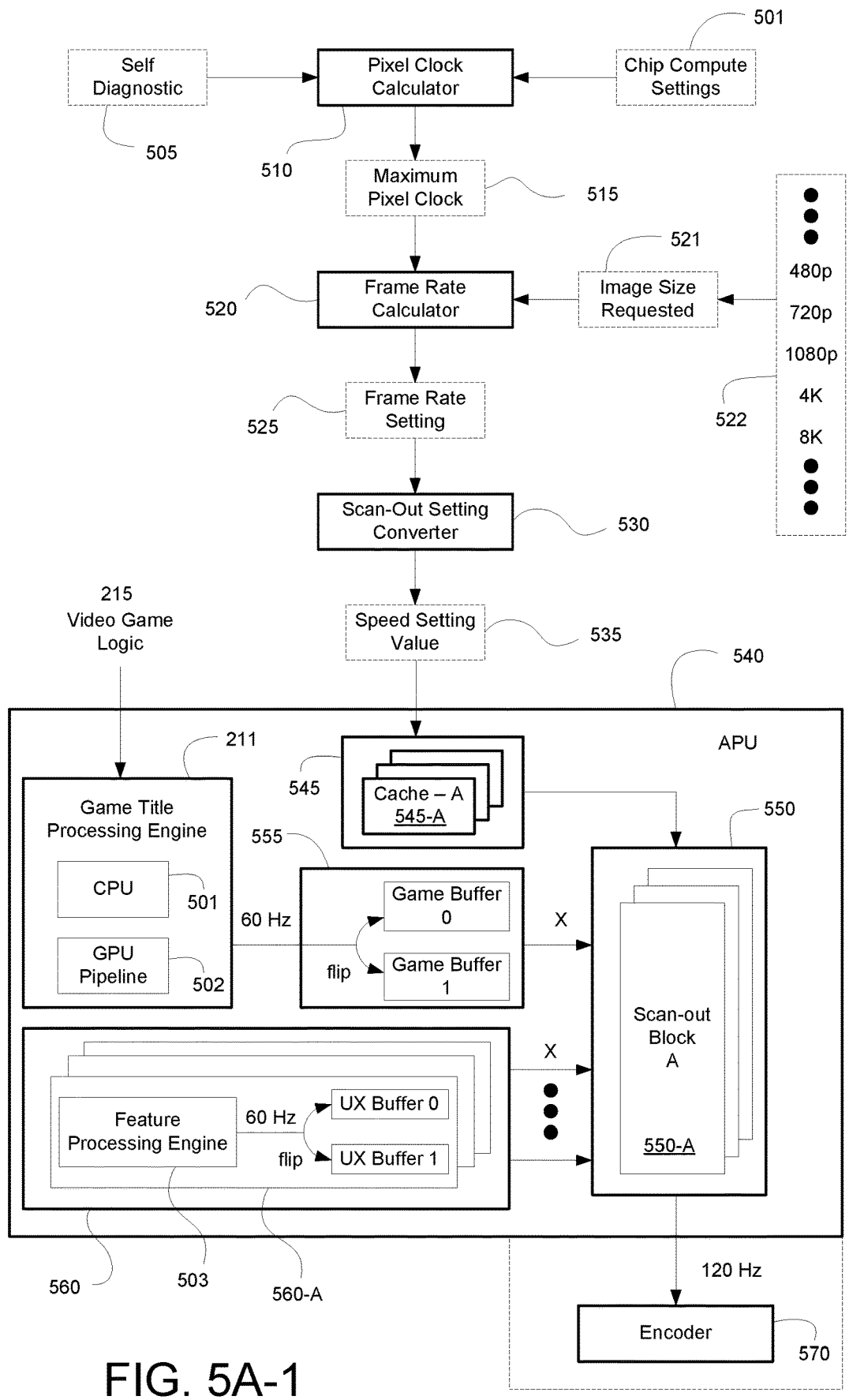
FIG. 5A-1 illustrates an accelerated processing unit (APU) configured for performing high speed scan-out operations for delivery to an encoder when streaming content from a video game executing at a cloud gaming server across a network, or alternatively a CPU and GPU connected over a bus (e.g., PCI Express), in accordance with one embodiment of the present disclosure.

FIG. 5A-1 illustrates a chip set 540 that is configured for performing high speed scan-out operations for delivery to an encoder when streaming content from a video game executing at a cloud gaming server across a network, in accordance with one embodiment of the present disclosure. In addition, the chip set 540 may be configured to execute the scan-out operations earlier, such as before an occurrence of the next system VSYNC signal or at a flip time of the corresponding video frame. In particular, FIG. 5A-1 illustrates how the speed of the scan-out block 550 is determined for a target display of a client, in one embodiment.

The chip set 540 is configured to operate at a maximum pixel clock 515. The pixel clock defines the rate at which the chip set is able to process pixels, such as through the scan-out block 550. The rate of a pixel clock is normally expressed in megahertz values representing numbers of pixels that can be processed. In particular, the pixel clock calculator 510 is configured to determine the maximum pixel clock 515 based on chip compute settings 501 and/or self-diagnostic test 505. For example, chip set 540 may be designed with a particular maximum pixel clock, which is included in the chip compute setting 501. However, once built the chip set 540 may be able to operate at a higher pixel clock, or may not actually operate at the designed pixel clock as determined from the chip compute setting 501. As such, testing 505 may be performed to determine a self-diagnostic pixel clock 505. Pixel clock calculator 510 may be configured to define the maximum pixel clock 515 for the chip set 540 based on the higher of the designed pixel clock as determined from the chip compute setting 501 or the self-diagnostic pixel clock 505. For purposes of illustration, an exemplary maximum pixel clock may be 300 megapixels per second (Mpps).

The scan-out block 550 operates at a speed corresponding to a targeted display of a client 210. In particular, the frame rate calculator 520 determines the frame rate setting 525 based on various input, including the maximum pixel clock 515 of the chip set 540 and an image size requested 521. The information in the image size requested 521 may be taken from values 522, including conventional display values (e.g., 480p, 720p, 1080p, 4K, 8K, etc.), as well as other defined values. For the same maximum pixel clock there may be different frame rate settings depending on the target display of the client, wherein the frame rate setting is determined by dividing the maximum pixel clock 515 by the number of pixels of the target display. For example, at a maximum pixel clock of 300 megapixels per second, the frame rate setting for a 480p display (e.g., approximately 300 k pixels such as used in a mobile phone) is approximately 1000 Hz. Also, at the same maximum pixel clock of 300 megapixels per second, the frame rate setting for a 1080p display (approximately 2 megapixels) is approximately 150 Hz. Also for illustration, at the maximum pixel clock of 300 megapixels per second, the frame rate setting for a 4k display is approximately 38 Hz.

The frame rate setting 525 is input to the scan-out setting converter 530, which is configured to determine a speed setting value 535 that is formatted for the chip set 540. For example, the chip set 540 may be operating at a bit rate. In one embodiment, the speed setting value 535 may be the frame rate setting 525 (e.g., frames per second). In some embodiments, the speed setting value 535 may be determined to be a multiple of a base frame rate. For instance, the speed setting value 535 may be set to be a multiple of 30 frames per second (e.g., 30 Hz), such as 30 Hz, 60 Hz, 90 Hz, 120 Hz, 150 Hz, etc. The speed setting value 535 is input to cache 545 of the chip set 540 for access by the corresponding scan-out block 550 in the chip set to determine its operating speed for a target display of a client 210.

Chip set 540 includes a game title processing engine 211 that is configured to execute video game logic 215 of a video game to generate game rendered video frames for streaming back to a client 210. As shown, the game title processing engine 211 includes CPU 501 and GPU 502 (e.g., configured to implement a graphics pipeline). In one embodiment, the CPU 501 and GPU 502 is configured as an accelerated processing unit (APU) that is configured to integrate the CPU and GPU onto the same chip or die using the same bus for faster communication and processing. In another embodiment, the CPU 501 and GPU 502 may be connected over a bus, such as PCI-Express, Gen-Z, etc. A plurality of game rendered video frames for the video game is generated and placed into buffers 555 (e.g., display buffer or frame buffer), which includes one or more game buffers, such as game buffer 0 and game buffer 1. Game buffer 0 and game buffer 1 is driven by a flip control signal to determine which game buffer is to store which video frame being outputted from the game title processing engine 211. The game title processing engine is operating at a particular speed that is defined by the video game. For example, video frames may be outputted by the game title processing engine 211 at 30 Hz or 60 Hz, etc.

Additional information may be optionally generated for inclusion with the game rendered video frames. In particular, feature generation block 560 includes one or more feature generation units, wherein each unit is configured to generate a feature. Each feature generation unit includes a feature processing engine and buffers. For example, feature generation unit 560-A includes a feature processing engine 503. In one implementation, feature processing engine 503 is executing on the CPU 501 and GPU 502 of the game title processing engine 211 (e.g., on other threads). Feature processing engine 503 may be configured to generate a plurality of user interface (UX) features, such as user interfaces, messaging, etc. The UX features may be presented as overlays, in one implementation. The plurality of UX features generated for the video game is placed into buffers (e.g., display buffer or frame buffer), which includes one or more UX buffers, such as UX buffer 0 and UX buffer 1. UX buffer 0 and UX buffer 1 is driven by a corresponding flip control signal to determine which UX buffer is to store which feature being outputted from the feature processing engine 503. Also, the feature processing engine 503 is operating at a particular speed that may be defined by the video game. For example, video frames may be outputted by the feature processing engine 503 at 30 Hz or 60 Hz, etc. The feature processing engine 503 may also be operating at a speed that is independent of the speed at which video frames may be outputted by the game title processing engine 211 (i.e., at rates other than 30 Hz or 60 Hz, etc.).

The game rendered video frames scanned from buffers 555 and the optional features scanned from the buffers of the feature generation units (e.g., unit 560-A) are scanned to the scan-out block 550 at a rate X. The rate X for scanning the game buffers 555 holding game rendered video frames and/or the UX buffers holding features may not correspond to the speed setting value 535, in one implementation, such that the information is scanned out as quickly as possible from the buffers. In another implementation, the rate X does correspond to the speed setting value 535.

As previously described, the scan-out block 550 operates at a speed that corresponds to a target display of client 210. Where there may be multiple clients having multiple target displays (e.g., mobile phone, television display, computer monitor, etc.), there may be multiple scan-out blocks, each supporting a corresponding display, and each operating at a different speed setting value. For example, scan-out block A (550-A) receives game rendered video frames from the buffers 555, and feature overlays from the feature generation block 560. The scan-out block A (550-A) operates by the corresponding speed setting value in cache-A (545-A), such as a corresponding frame rate setting. As such, for the targeted display, the scan-out block 550 outputs modified video frames at the rate defined by the speed setting value. (e.g., 120 Hz) to the encoder 570. That is the rate at which modified video frames are outputted to the encoder 570 is higher than the rate at which video frames are being generated and/or encoded, wherein the rate is based on the maximum pixel clock of the chip set 540 including the scan-out block 550 and the image size of the targeted display.

In one implementation, the encoder 570 may be part of the chip set 540. In other implementations, encoder 570 is separate from the chip set 540. The encoder 570 is configured in part to compress the modified video frames for streaming to client 210. For example, the modified video frame is encoded on an encoder slice-by-slice basis to generate one or more encoded slices for a corresponding modified video frame. The one or more encoded slices for a corresponding modified video frame including additional feature overlays is then streamed over a network to a target display of a client 210. The encoder outputs the one or more encoded slices at a rate that is independent of the speed setting value, and may be tied to the server and client VSYNC signals that are synchronized and offset, as previously described. For example, the one or more encoded slices may be output at 60 Hz.

Figures 2, 5A:
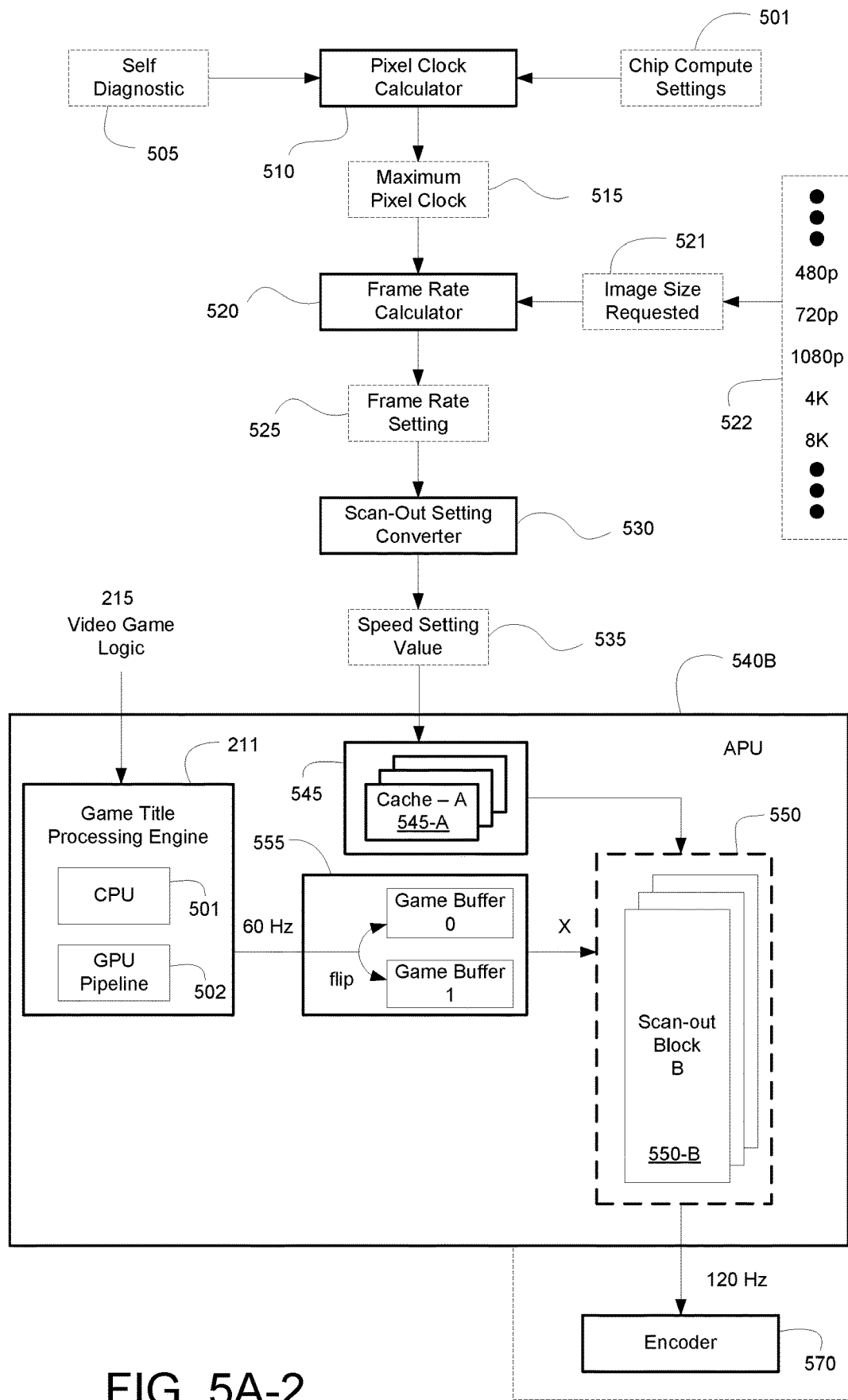

FIG. 5A-2 illustrates a chip set 540B that is configured for performing high speed scan-out operations for delivery to an encoder when streaming content from a video game executing at a cloud gaming server across a network, wherein optional user interface features may be integrated into game rendered video frames, in accordance with one embodiment of the present disclosure. In addition, the chip set 540 may be configured to execute the scan-out operations earlier, such as before an occurrence of the next system VSYNC signal or at a flip time of the corresponding video frame. Some components illustrated in FIG. 5A-2 are similar to the components of FIG. 5A-1, wherein similar features have similar functionality. Differences between FIGS. 5A-2 and 5A-1 are illustrated in respective chip sets. In particular, between FIGS. 5A2 and 5A-1 the configuration of chip set 540B of FIG. 5A-2 is different in that there is no separate feature generation block. As such, one or more optional UX features may be generated by the CPU 501 and/or GPU 502 and integrated into the game rendered video frames that are placed into buffers 555, as previously described. That is, the features need not be provided as overlays as they are integrated into the rendered video frames. The game rendered video frames may be optionally scanned from buffers 555 to the scan-out block 550, which includes one or more scan-out blocks 550-B for one or more target displays of client(s). As previously described, a corresponding scan-out block 550-B operates at a speed of a target display. As such, for the targeted display, the corresponding scan-out block 550-B outputs video frames at the rate defined by the speed setting value to the encoder 570. In some embodiments, because features are integrated into the game rendered video frames thereby only requiring buffer 555, the rendered video frames may be scanned directly into the encoder and bypasses the scan-out block 550. In that case, the additional operations performed during scan-out may be performed by the CPU 501 and/or GPU 502, for example.

Figures 1, 5B:
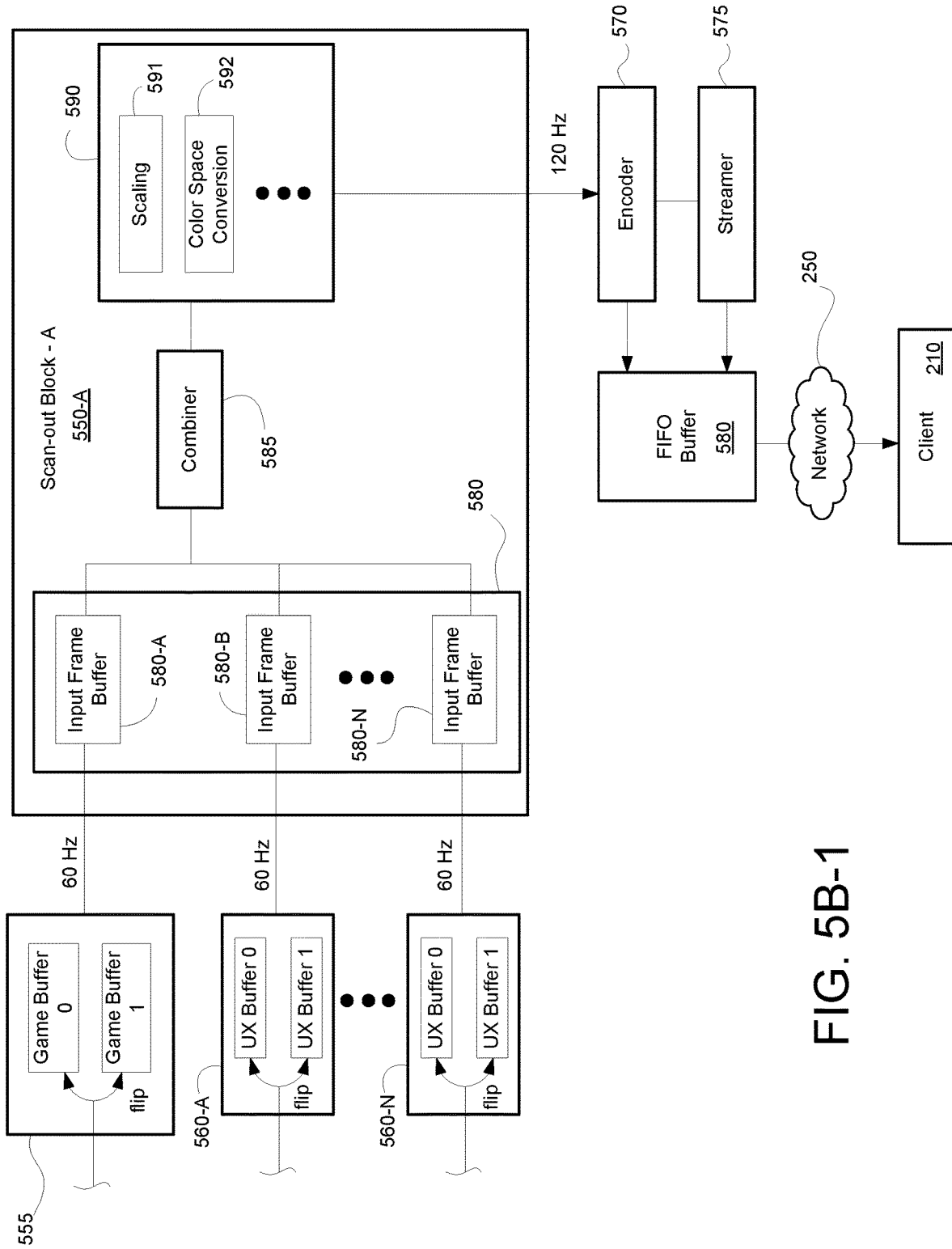
Figures 2, 5B:
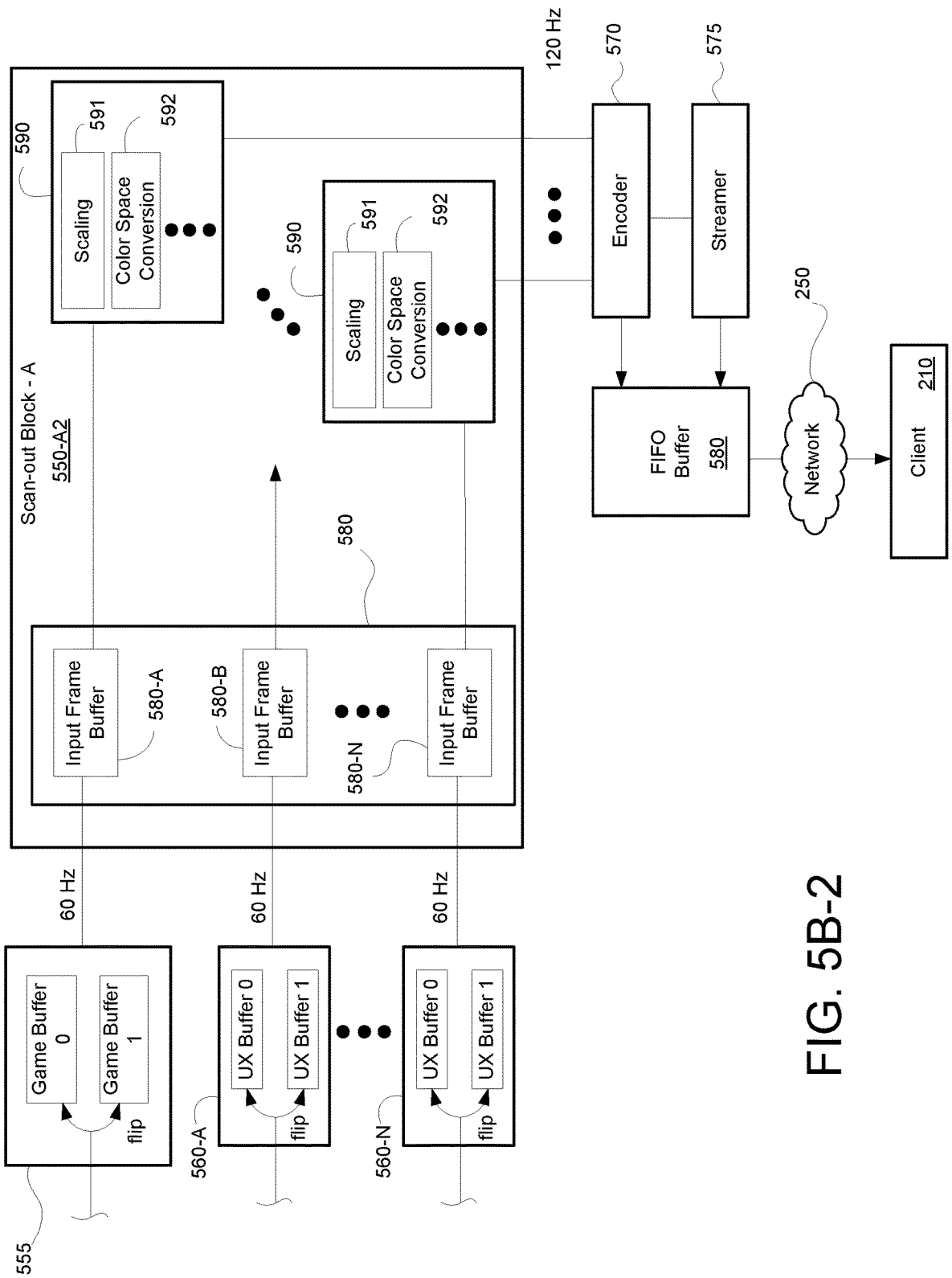
Figures 3, 5B:
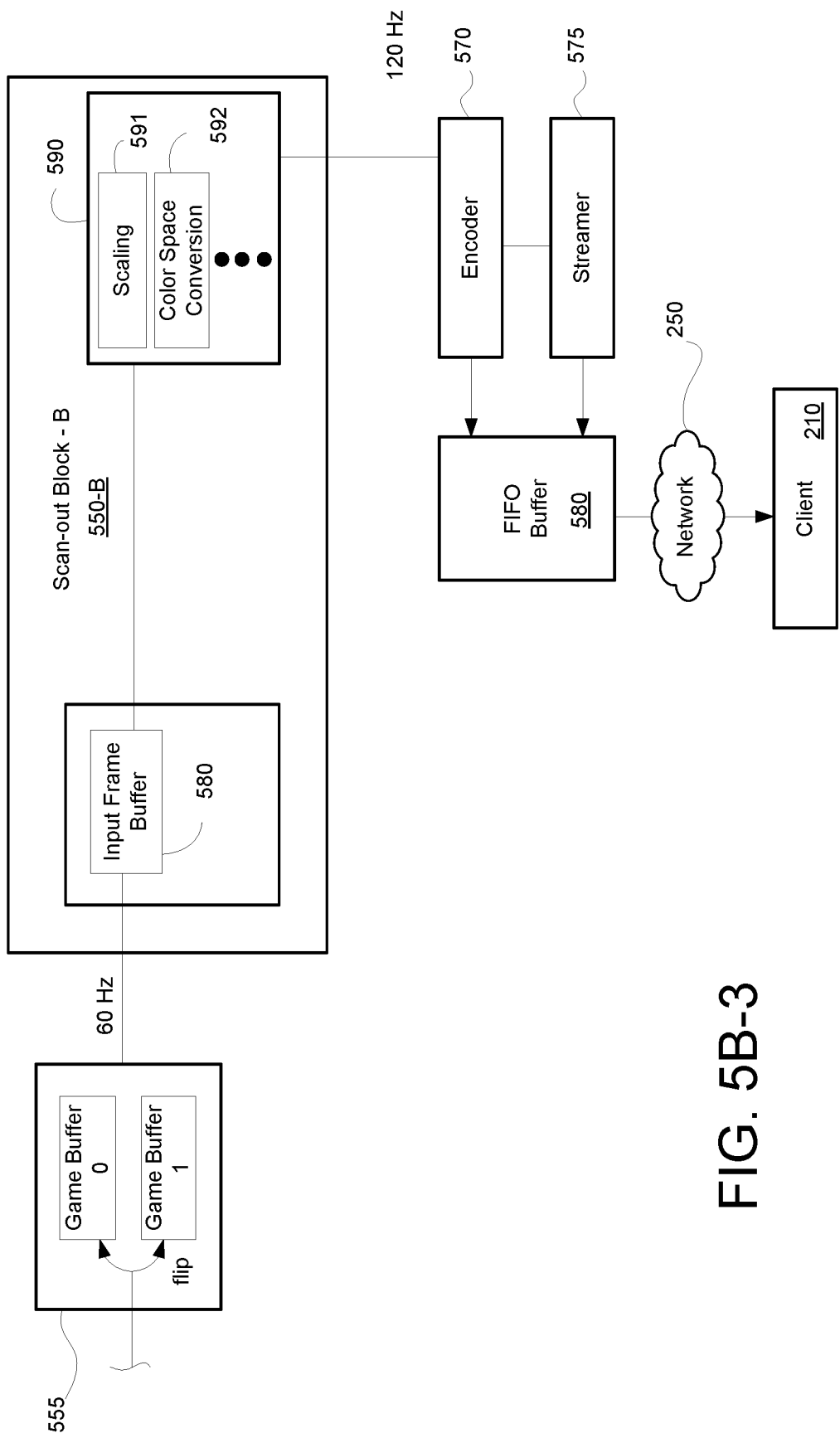

FIG. 5B-1 illustrates the scan-out operations being performed on game rendered video frames that may optionally include one or more additional features (e.g., layers) for delivery to an encoder when streaming content from a video game executing at a cloud gaming server across a network to a client, in accordance with one embodiment of the present disclosure. For example, FIG. 5B-1 illustrates the operation of scan-out block 550-A of FIG. 5A-1. Scan-out block A (550-A) receives the game rendered video frames scanline-by-scanline.

In particular, scan-out block A (550-A) receives game rendered video frames from the buffers 555, and feature overlays from the feature generation block 560, which are provided to input buffers 580. As previously described, the scan-out block A (550-A) operates by the corresponding speed setting value in cache-A (545-A), such as a corresponding frame rate setting for a target display of a client 210. For example, a plurality of game rendered video frames is output from game buffer 0 and game buffer 1 as controlled by the flip control signal to the input frame buffer 580-A of scan-out block A (550-A).

In addition, scan-out block A (550-A) may optionally receive one or more UX features (e.g., as overlays). For example, a plurality of UX features is output from buffer 560-A, which includes UX buffer 0 and UX buffer 1, as controlled by a corresponding flip control signal. The plurality of UX features is scanned to input frame buffer 580-B of the scan-out block-A (550-A). Other feature overlays may be provided, wherein exemplary UX features may include user interfaces, system user interfaces, texting, messaging, menus, communications, additional gaming viewpoints, eSports information, etc. For example, an additional plurality of UX features may be output from buffers 560A-560N, each of which includes UX buffer 0 and UX buffer 1, as controlled by a corresponding flip control signal. For illustration, a plurality of UX features is output from buffer 560-N to the input frame buffer 580-N.

The information in the input frame buffers 580 is output to the combiner 585, which is configured to composite the information. For example, for each corresponding video frame being generated by the video game, the combiner 585 combines the game rendered video frame from input frame buffer 580-A with each of the optional UX features provided in input frame buffer 580-B through 580-N.

The game rendered video frame combined with one or more optional UX features is then provided to block 590, wherein additional operations may be performed to generate a modified video frame that is suitable for display. The additional operations performed during the scan-out process in block 590 may include one or more operations, such as decompressing DCC compressed surface, resolution scaling to the target display, color space conversion, degamma, HDR expansion, gamut remap, LUT shaping, tone mapping, blending gamma, blending, etc.

In other implementations, the additional operations outlined in block 590 are performed at each of the input frame buffers 580 to generate a corresponding layer of the modified video frame. For example, input frame buffers may be used to store and/or generate game rendered video frames of the video game, and one or more optional UX features (e.g., as overlays), such as a user interface (UI), system UIs, text, messaging, etc. The additional operations may include decompressing DCC compressed surface, resolution scaling, color space conversion, degamma, HDR expansion, gamut remap, LUT shaping, tone mapping, blending gamma, etc. After these operations are performed, the one or more layers of the input frame buffers 580 are composited and blended, optionally placed into a display buffer, and then scanned to an encoder (e.g., scanned from the display buffer).

As such, for the targeted display, the scan-out block 550-A outputs a plurality of modified video frames at the rate defined by the speed setting value (e.g., 120 Hz) to the encoder 570. That is, the rate at which modified video frames are outputted to the encoder 570 is higher than the rate at which video frames are being generated and/or encoded, wherein the rate is based on the maximum pixel clock of the chip set 540 including the scan-out block 550 and the image size of the targeted display. As previously described, the encoder 570 compresses each of the modified video frames. For example, a corresponding modified video frame may be compressed into one or more encoded slices (encoder slices that are compressed), which may be further packetized for network streaming. The modified video frames that have been compressed and/or packetized into encoded slices are then stored into a buffer 580 (e.g., first-in-first-out or FIFO buffer). Streamer 575 is configured to transmit the encoded slices over the network 250 to the client 210. As previously described, the streamer device may be configured to operate at the application layer of a transmission control protocol/internet protocol (TCP/IP) computer networking model. In embodiments, assuming an IP based network (e.g., home/internet), TCP/IP or UDP may be used. For example, cloud gaming services may use UDP.

TCP/IP guarantees all the data arrives; however the "arrival guarantees" come at the cost of retransmissions, which introduce additional latency. On the other hand, UDP based protocols offer the best latency performance, but at the cost of packet loss, which incurs data loss.

FIG. 5B-2 illustrates the scan-out operations being performed on game rendered video frames that may optionally include one or more additional features (e.g., layers) for delivery to an encoder when streaming content from a video game executing at a cloud gaming server across a network to a client, in accordance with one embodiment of the present disclosure. For example, FIG. 5B-2 illustrates the operation of scan-out block 550-A2. Scan-out block A2 (550-A2) receives the game rendered video frames scanline-by-scanline. The configuration of scan-out block 550-A2 of FIG. 5B-2 is similar to the scan-out block 550-A of FIG. 5B-1, wherein similar features have similar functionality. The scan-out block 550-A2 of FIG. 5B-2 is different than scan-out block 550-A of FIG. 5B-1 because there is no combiner 585. As a result, the game rendered video frames and UX feature overlays may be composited and blended at the client side.

As shown, the information in each of the input frame buffers 580 is delivered to a corresponding block 590, wherein additional operations are performed. That is, additional operations outlined in block 590 are performed for each of the input frame buffers 580 to generate a corresponding layer. The additional operations may include decompressing DCC compressed surface, resolution scaling, color space conversion, degamma, HDR expansion, gamut remap, LUT shaping, tone mapping, blending gamma, etc. After these operations are performed, the one or more layers that that have been modified is delivered separately to the encoder 570. The encoder delivers each layer separately to the client, wherein the client may composite and blend the layers to generate the modified video frame for display.

FIG. 5B-3 illustrates scan-out operations being performed on game rendered video frames for delivery to an encoder when streaming content from a video game executing at a cloud gaming server across a network to a client, in accordance with one embodiment of the disclosure. For example, FIG. 5B-3 illustrates the operation of scan-out block 550B of FIG. 5A-2, wherein there is no combiner functionality in the scan-out block 550-B. Some components of scan-out block 550-B is similar to the scan-out block 550-A of FIG. 5B-1, wherein similar features have similar functionality. The scan-out block 550-B of FIG. 5B-3 is different than scan-out block 550-A of FIG. 5B-1 because there is no combiner (e.g. for performing compositing and blending), and a single input frame buffer as there is no separate feature generation. In particular, scan-out block B (550-B) receives the game rendered video frames scanline-by-scanline from the buffers 555. Optionally, user interface features may be integrated into the game rendered video frames generated by a CPU and/or GPU. For example, a plurality of game rendered video frames is output from game buffer 0 and game buffer 1 as controlled by the flip control signal to the input frame buffer 580 of scan-out block B (550-B). The game rendered video frame is then provided to block 590, wherein additional operations (e.g., decompressing DCC compressed surface, resolution scaling to the target display, color space conversion, etc.) may be performed to generate a modified video frame that is suitable for display, as previously described. Additional operations may not need to perform compositing and/or blending, as optional UX features have already been integrated into the game rendered video frames. In some implementations, the additional operations outlined in block 590 may be performed at the input frame buffer 580. As such, for a targeted display, the scan-out block 550-B outputs a plurality of modified video frames (e.g., at the rate defined by a corresponding speed setting value) to the encoder 570. As previously described, the encoder 570 compresses each of the modified video frames, such as into one or more encoded slices (encoder slices that are compressed), which may be further packetized for network streaming. The modified video frames that have been compressed and/or packetized into encoded slices are then stored into buffer 580. Streamer 575 is configured to transmit the encoded slices over the network to the client 210, as previously described.

Figure 5C:
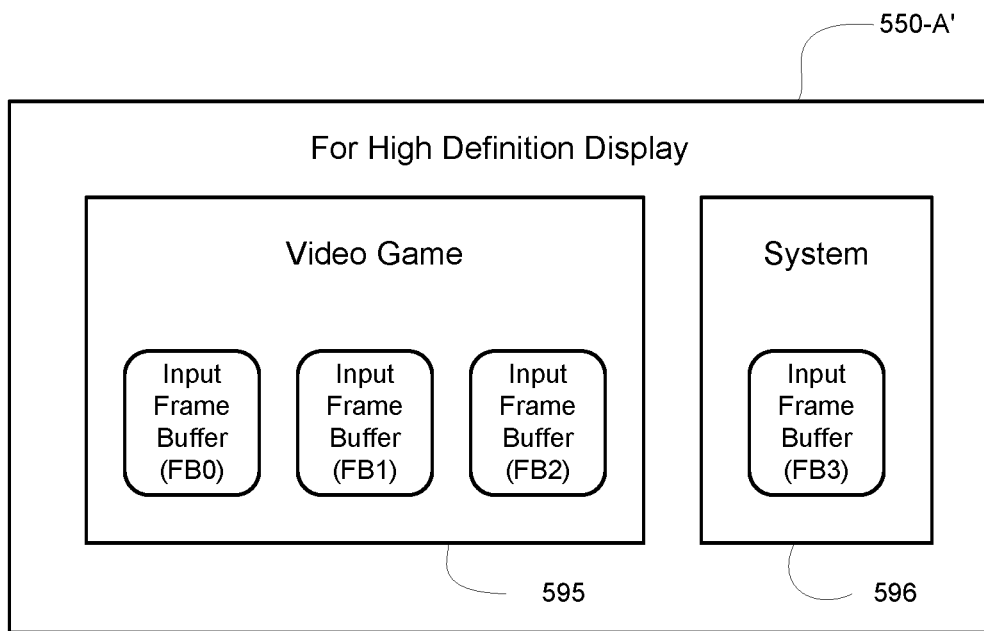
FIGS. 5C-5D show exemplary server configurations having one or more input frame buffers used when performing high speed scan-out operations for delivery to an encoder when streaming content from a video game executing at a cloud gaming server across a network, in accordance with embodiments of the present disclosure.
Figure 5D:
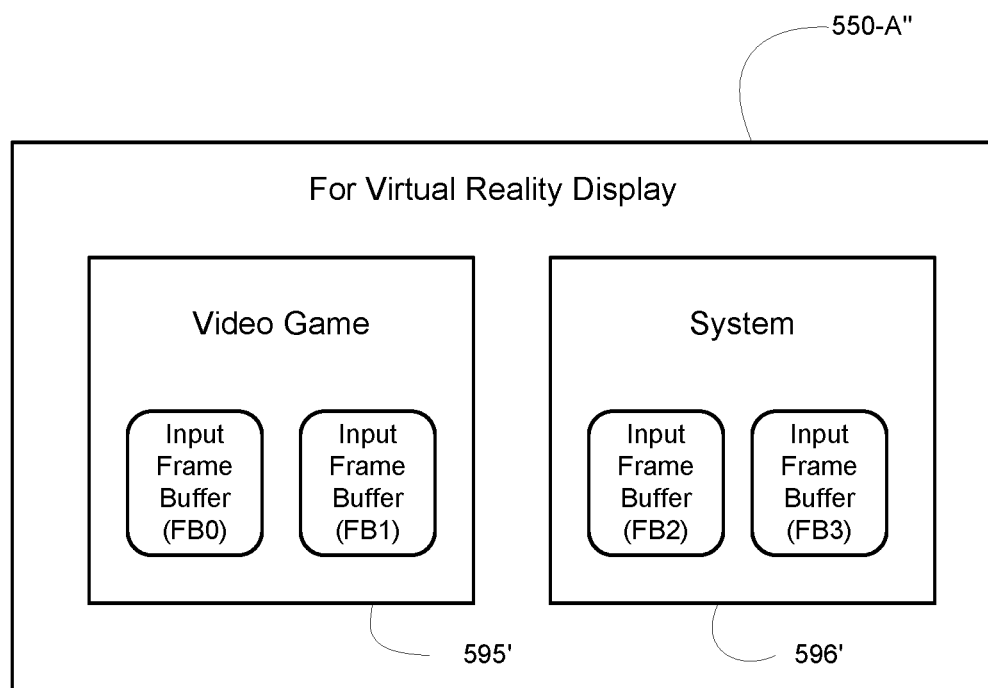

FIGS. 5C-5D show exemplary server configurations including a scan-out block having one or more input frame buffers used when performing high speed scan-out operations for delivery to an encoder when streaming content from a video game executing at a cloud gaming server across a network, in accordance with embodiments of the present disclosure. In particular FIGS. 5C-5D show exemplary configurations for scan-out block 550-A of FIG. 5A-1 and/or scan-out block 550B of FIG. 5A-2, that includes one or more input frame buffers used for generating composited video frames to be displayed on a high definition display or a virtual reality (VR) display (e.g., head mounted display). In one implementation, the input frame buffers may be implemented in hardware.

FIG. 5C shows scan-out block 550-A' that includes four input frame buffers that can be used to generate composited video frames for a high definition display. Purely for example, three input frame buffers (e.g., FB0, FB1, and FB2) are dedicated for the video game, and may be used for storing and/or generating a corresponding layer including at least one of video frames, a UI, eSports UI, and text layers. The input frame buffers for the video game may generate game rendered video frames from one or more viewpoints in the gaming environment. Another input frame buffer FB3 is dedicated for the system, and may be used for generating a system overlay (e.g., UI), such as including friend notifications.

FIG. 5D shows scan-out block 550-A" that includes four input frame buffers that can be used to generate composited video frames for a VR display. Purely for example, two input frame buffers (e.g., FB0 and FB1) are dedicated for the video game, and may be used for storing and/or generating a corresponding layer including at least one of video frames taken from different viewpoints of a gaming environment, a UI, eSports UI, and text layers. Another two input frame buffers (FB2 and FB3) are dedicated for the system, and may be used for generating a system overlay (e.g., UI), such as including friend notifications, or an eSports UI, etc.

In embodiments of the present disclosure, at the server, high speed and/or early scan-out/scan-in may be performed without consideration of display requirements and/or parameters as no physical display is attached to the server. In particular, the server may be performing scan-out/scan-in for a targeted virtual display, wherein the virtual display may be user defined to operate at a selected frequency (e.g., 93 Hz, 120 Hz).

Figure 6:
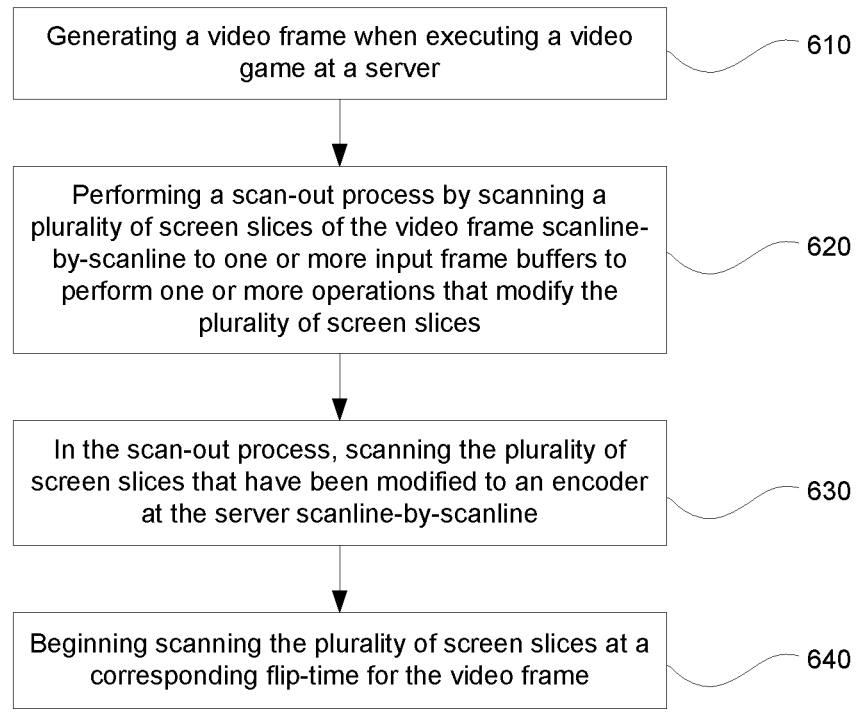
FIG. 6 is a flow diagram illustrating a method for cloud gaming, wherein an early scan-out process is performed to initiate an encode process earlier thereby reducing one-way latency between the server and the client, in accordance with one embodiment of the disclosure.

With the detailed description of the various client devices 210 and/or the cloud gaming network 290 (e.g., in the game server 260) of FIGS. 2A-2D, flow diagram 600 of FIG. 6 illustrates a method for cloud gaming in which high speed and/or early scan-out operations may be performed to reduce one-way latency between the cloud gaming server and the client, in accordance with one embodiment of the present disclosure.

At 610, the method includes generating a video frame when executing a video game at a server. For example, the server may be executing a video game in a streaming mode, such that the CPU of a server executes a video game responsive, in part, to input commands from a user, or game logic not driven by control information from the user, in order to generate game rendered video frames using a graphics pipeline that can be used for streaming. In particular, a CPU executing the video game in cooperation with a GPU graphics pipeline are configured to generate a plurality of video frames. In cloud gaming, the game generated video frames are typically rendered for display on a virtual display. The server may perform additional operations in a scan-out process on the game generated video frames. For example, one or more overlays may be added to a corresponding game generated video frame, such as during a scan-out process.

At 620, the method includes performing a scan-out process by scanning a plurality of screen slices of the video frame scanline-by-scanline to one or more input frame buffers to perform one or more operations that modify the plurality of screen slices. As previously described, UX features (e.g., overlays) may be scanned to the one or more input frame buffers. As such, the one or more input frame buffers may be used to store and/or generate game rendered video frames of the video game, and one or more optional UX features (e.g., as overlays), such as a user interface (UI), system UIs, text, messaging, etc. The scan-out process generates a modified video frame that is composited and blended to include one or more optional UX features, such as those implemented through overlays. In one implementation, the UX features (e.g., as overlays) are composited first and then additional operations are performed, as previously described. For example, the additional operations may include decompressing DCC compressed surface, resolution scaling, color space conversion, degamma, HDR expansion, gamut remap, LUT shaping, tone mapping, blending gamma, etc. In another implementation, the additional operations are performed on each of the UX features before compositing and blending, as previously described.

At 630, after the modified video frame is generated, in the scan-out process the plurality of screen slices of the modified video frame is scanned to the encoder scanline-by-scanline. As such, the modified game generated video frame (e.g., modified with optional UX feature layers) is scanned into the encoder for compression in preparation of streaming the modified video frame to a client, such as when streaming content from a video game executing at the cloud gaming server across a network to the client.

In particular, at 640, the method includes beginning the scan-out process early. In one embodiment, the plurality of screen slices of the game generated video frame is scanned to the one or more input frame buffers at a corresponding flip-time for the video frame. That is, instead of waiting for the next occurrence of the server VSYNC signal to begin the scan-out process, the modified video frame is scanned to a corresponding input frame buffer earlier (i.e., before the next server VSYNC signal). The flip-time may be included in a command in a command buffer that when executed by the GPU in a graphics pipeline indicates that GPU has finished executing a plurality of commands in the command buffer and that the game rendered video frame is fully loaded to a display buffer of the server. That game rendered video frame is then scanned to a corresponding input frame buffer during the scan-out process. In addition, one or more optional UX features (e.g., overlays) are also scanned to the one or more input frame buffers at a corresponding flip-time generated for the UX features.

In another embodiment, the scan-out process is performed at high speed when streaming content from a video game executing at a cloud gaming server across a network, in accordance with one embodiment of the present disclosure. For example, the scan-out process operates at a speed/rate that corresponds to a target display of the client, and is based on the maximum pixel clock of the server and the requested image size of the target display, as previously described. For example, the scan-out process includes receiving game rendered video frames and feature overlays that are then composited, wherein additional operations may be performed on the composited video frames, such as scaling, color scaling, blending, etc. As previously described, the scan-out process outputs modified video frames at a scan-out rate that is based on a speed setting value (e.g., 120 Hz), wherein the speed setting value is based on the maximum pixel clock of the server and the requested image size of the target display. In one implementation, the speed setting value is the frame rate. As such, the scan-out rate at which modified video frames are outputted to the encoder may be higher than the rate at which video frames are being generated and/or encoded.

Each modified video frame may be split into one or more encoder slices that are then compressed—as one or more encoded slices. In particular, the encoder receives the modified video frame and encodes the modified video frame on an encoder slice-by-slice basis to generate one or more encoded slices. As previously described, the boundaries of an encoded slice are not restricted to a single scanline, and may be comprised of a single scanline, or multiple scanlines. Additionally, the end of an encoded slice and/or the start of the next encoded slice may not necessarily occur at the edges of the display screen (e.g., may occur somewhere mid-screen or in the middle of a scanline). In one embodiment, because server and client VSYNC signals are synchronized and offset, operations at the encoder may be overlapped. In particular, the encoder is configured to generate a first encoded slice of the modified video frame, wherein the modified video frame may include multiple encoded slices. The encoder may be configured to begin compressing the first encoded slice before fully receiving modified video frame. That is, the first encoded slice may be encoded (e.g., compressed) before fully receiving the plurality of screen slices of the modified video frame, wherein the screen slices are delivered scanline-by-scanline. Depending on the number of processors or the hardware, multiple slices can be encoded simultaneously (e.g., in parallel), in some embodiments. For example, some gaming consoles can generate four encoded slices in parallel. More particularly, hardware encoders may be configured to compress multiple encoder slices (e.g., to generate one or more encoded slices) in parallel due to the hardware pipelining.

Figure 7A:
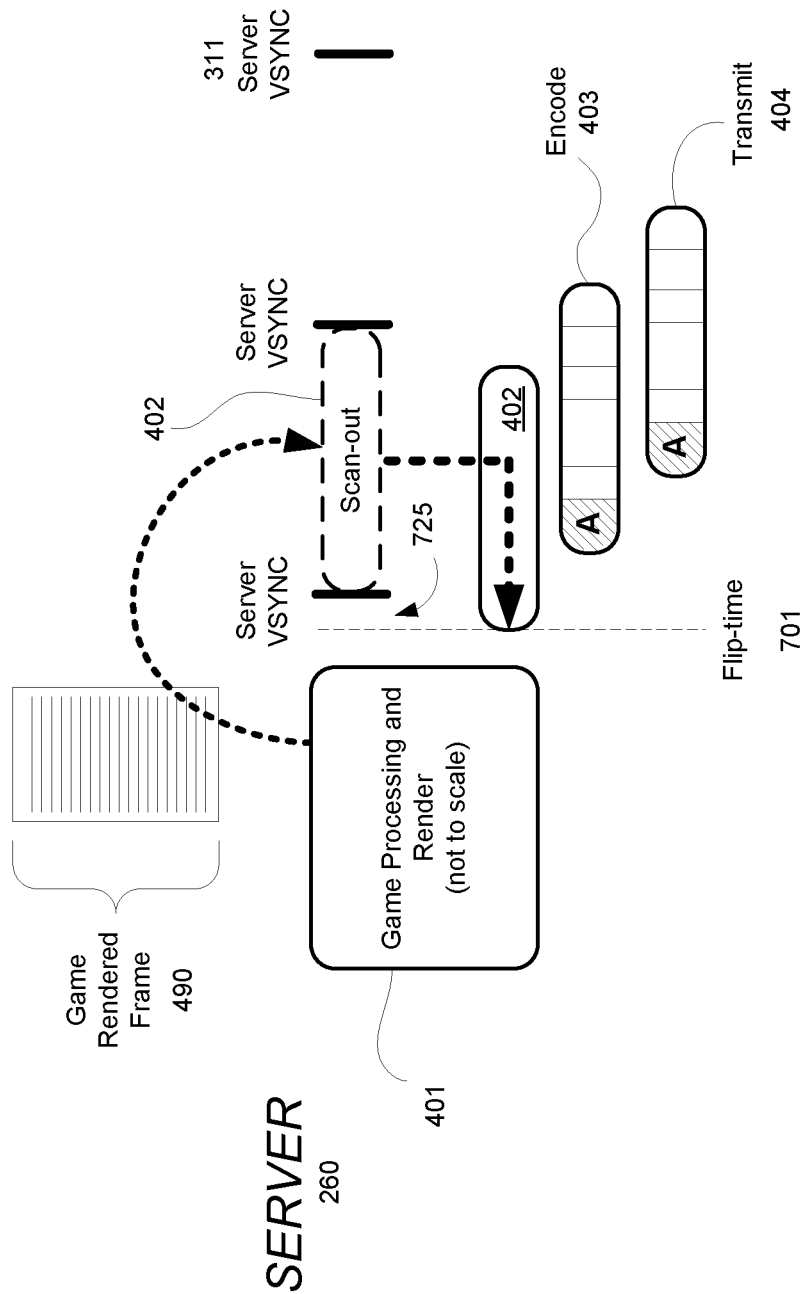
FIG. 7A illustrates a process for generating and transmitting video frames at a cloud gaming server, wherein the process is optimized to perform high speed and/or early scan-out to an encoder to reduce one-way latency between a cloud gaming server and a client, in accordance with one embodiment of the present disclosure.

FIG. 7A illustrates a process for generating and transmitting modified video frames at a cloud gaming server, wherein the process is optimized to perform high speed and/or early scan-out to an encoder to reduce one-way latency between a cloud gaming server and a client, in accordance with one embodiment of the present disclosure. The process is shown with respect to generation and transmission of a single modified video frame that has been modified with additional UX features (e.g., overlays) at the server. Operations at the server include the generation of a game rendered video frame 490 at operation 401. The scan-out process 402 includes delivering the game rendered video frame 490 to one or more input frame buffers of a scan-out block to generate overlays that are composited. That is, the game rendered video frame 490 is composited with optional UX features (e.g., overlays). Additional operations are performed on the composited video frame (e.g., blending, resolution scaling, color space conversion, etc.) to generate a modified video frame (e.g., modifying the game rendered video frame with additional UX feature overlays). In the scan-out process, the modified video frame is scanned to an encoder. The modified video frame is encoded (e.g., performing compression) at operation 403 into an encoded video frame on an encoder slice-by-slice basis. The encoded video frame that is compressed is transmitted to the client from the server at operation 404.

As previously described, the scan-out process 402 is shown being performed early before the occurrence of server VSYNC signal 311. Typically, scan-out begins at the next occurrence of the server VSYNC signal. In one embodiment, early scan-out is performed at flip-time 701, wherein flip-time occurs when the GPU has finished generating the rendered frame 490, as previously described.

By performing an early scan-out process, one-way latency between server and client may be reduced, as remaining server operations (e.g., encode, transmit, etc.) may also begin earlier and/or overlapped. In particular, additional time 725 is gained by performing early scan-out, wherein the additional time is defined between flip-time 701 and the next occurrence of the server VSYNC signal. That additional time 725 may offset any adverse latency variations experienced during other operations, such as encode 403 or transmit 404. For example, if an encode process 403 takes longer than a frame period, when that encode process 403 begins early (e.g., not synchronized to begin at a VSYNC signal) the additional time gained may be enough for the video frame to be encoded before the next server VSYNC signal. Similarly, the additional time gained by performing early scan-out operations may be given to reduce any variation in latency (e.g., increased delivery time over the network) when delivering the video frame to the client.

Figure 7B:
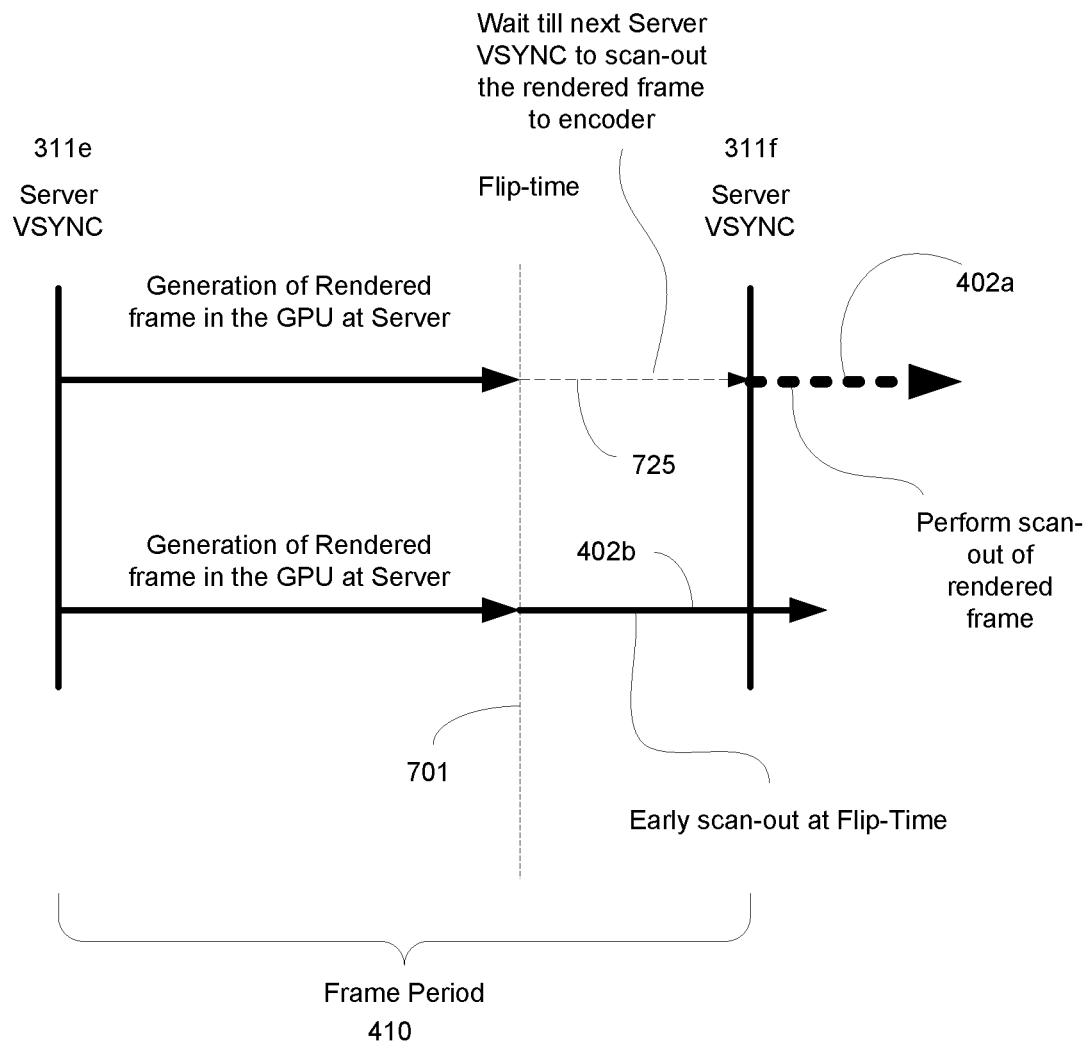
FIG. 7B illustrates the timing of when a scan-out process is performed at a cloud gaming server, wherein scan-out is performed at high speed and/or is performed early such that the video frame can be scanned to an encoder earlier thereby reducing one-way latency between a cloud gaming server and a client, in accordance with one embodiment of the present disclosure.

FIG. 7B illustrates the timing of when a scan-out process is performed at a cloud gaming server, wherein scan-out is performed at high speed and/or is performed early such that the video frame can be scanned to an encoder earlier at the end of the scan-out process thereby reducing one-way latency between a cloud gaming server and a client, in accordance with one embodiment of the present disclosure. Typically, the application program (e.g., video game) running on the server requests a "flip" of the display buffer to occur when rendering is complete. The flip occurs during execution of a flip command at a flip-time 701 during a frame period 410, wherein the flip command is executed by a graphics processing unit (GPU). The flip command is one of a plurality of commands placed into a command buffer by the central processing unit (CPU) when executing the application, wherein the commands in the command buffer are used to render a corresponding video frame by the GPU. As such, the flip indicates that the GPU has finished executing the commands in the command buffer to generate the rendered video frame, and that the rendered video frame is fully loaded to a display buffer of the server. There is a waiting period 725, after which on the subsequent occurrence of server VSYNC signal 311$f$ the scan-out process 402$a$ is performed. That is, in the typical process, scan-out 402$a$ is performed after the waiting period 725, wherein modified video frame (e.g., game rendered video frame composited and blended with optional UX feature overlays) in the display buffer is scanned to the encoder to perform video encode. That is, the scan-out process typically occurs at the next VSYNC signal and after the waiting period, even though the display buffer is full at an earlier time.

Embodiments of the present disclosure provide for early scan-out 402b of the display buffer to the encoder, such as in cloud gaming applications. As shown in FIG. 7B, the scan-out process 402b is triggered earlier at flip-time 701, instead of the next occurrence of server VSYNC signal 311f. This allows the encoder to begin encoding earlier when operations are overlapped, rather than waiting for the next server VSYNC signal for performing scan-out for delivery to the encoder for encode/compression. Display timing is unaffected, as no display is actually attached to the server. Early encoding reduces one-way latency between the server and client, as processing of complex video frames have a lesser chance of missing one or more VSYNCs that are targeted for delivery to the client and/or for display at the client end, as previously described.

Figure 7C:
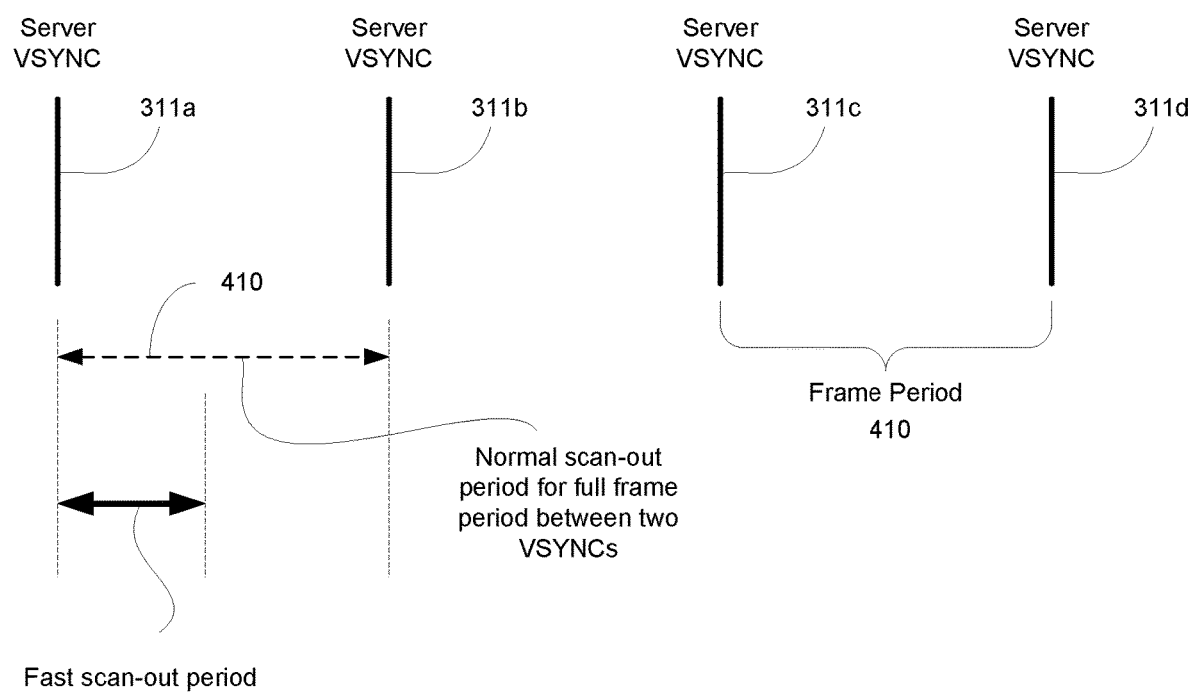
FIG. 7C illustrates the time period for performing scan-out at a high speed such that the video frame can be scanned to an encoder earlier thereby reducing one-way latency between a cloud gaming server and a client, in accordance with one embodiment of the present disclosure.

FIG. 7C illustrates the time period for performing scan-out at a high speed such that the video frame can be scanned to an encoder earlier thereby reducing one-way latency between a cloud gaming server and a client, in accordance with one embodiment of the present disclosure. In particular, the scan-out process may be performed at high speed when streaming content from a video game executing at a cloud gaming server across a network, wherein the scan-out process operates at a speed/rate that corresponds to a target display of the client, and is based on the maximum pixel clock of the server and the requested image size of the target display, as previously described. As such, the scan-out rate at which modified video frames are outputted to the encoder may be higher than the rate at which video frames are being generated and/or encoded. That is, the scan-out rate may not correspond to the rate at which the video game is generating video frames. For example, the scan-out rate (e.g., frame rate setting) is higher than a frequency of a server VSYNC signal that is used for generating video frames when executing the video game at the server.

In another embodiment, the scan-out speed may not correspond to the refresh rate (e.g. 60 Hz, etc.) of the display device of the client. That is, the display rate for the display device at the client and the scan-out speed may not be the same rate. For example, the display rate for the display device at the client may be at 60 Hz, or a variable refresh rate, etc., wherein the scan-out rate is at a different rate (e.g. 120 Hz, etc.).

Typically, the scan-out process of a video frame is performed over an entire frame period (e.g., 16.6 ms at 60 Hz). For example, one representative frame period 410 is shown between two server VSYNC signals 311c and 311d. In embodiments of the present disclosure, instead of performing the scan-out process for a rendered video frame over the entire frame period, scan-out is performed at a higher rate. By performing the scan-out process (e.g., including scanning to the encoder) at a rate (e.g., 120 Hz or even higher) that is higher than the rate of processing frames (e.g., 60 Hz), it is possible to begin the encode process earlier, such as when waiting for the end of the scan-out process 402 before beginning encode 403, or when overlapping scan-out 402 and encode 403. For example, the scan-out process 402 can be performed over a period 730 (e.g., approximately 8 ms) that is less than the full frame period 410 (e.g., 16.6 ms at 60 Hz).

In some cases, encoding can begin earlier, such as before the next occurrence of the server VSYNC signal. In particular, the encoder may begin processing as soon as a minimal amount of data from the corresponding modified video frame (e.g., game rendered video frame modified with one or more optional UX features as overlays) is delivered to the encoder (e.g., 16 or 64 scanlines), and then to process additional data as soon as it arrives at the encoder. One-way latency may be reduced as processing of complex video frames have a lesser chance of missing one or more VSYNCs that are targeted for delivery to the client and/or for display at the client end. One-way latency may be due to network jitter and/or increased processing times at the server. For instance, modified video frames with large amounts of data (e.g., a scene change) may take more than one frame period for encoding. With a faster scan-out process, there leaves more time for encoding, and modified video frames with a large amount of data have a better chance at completing the encode process before the server VSYNC signal that is targeted for delivery to the client.

In another embodiment, the encode process may be further optimized to guarantee the minimal amount of time for encoding by limiting the encoding resolution to that required by the client display, such that time is not wasted encoding a video frame a higher resolutions than the client display can handle or requests at a particular moment in time.

Figure 8A:
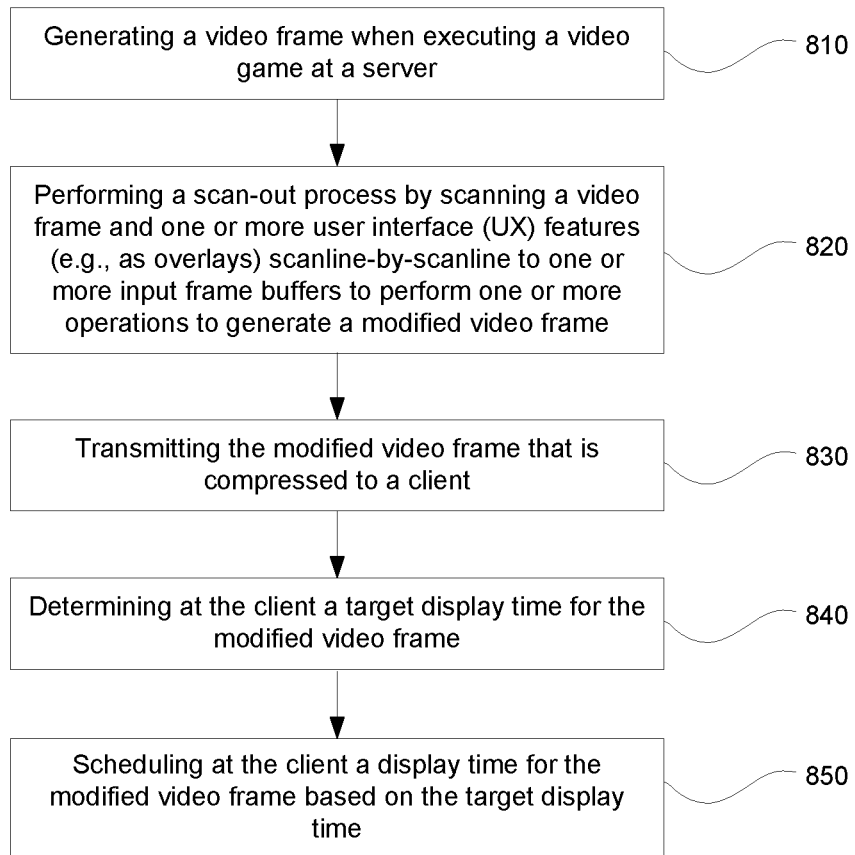
FIG. 8A is a flow diagram illustrating a method for cloud gaming in which client displayed video may be smoothed in cloud gaming applications, wherein high speed and/or early scan-out operations at the server may be performed to reduce one-way latency between the cloud gaming server and the client, in accordance with one embodiment of the present disclosure.

With the detailed description of the various client devices 210 and/or the cloud gaming network 290 (e.g., in the game server 260) of FIGS. 2A-2D, flow diagram 800A of FIG. 8A illustrates a method for cloud gaming in which client displayed video may be smoothed in cloud gaming applications, wherein high speed and/or early scan-out operations at the server may be performed to reduce one-way latency between the cloud gaming server and the client, in accordance with one embodiment of the present disclosure.

At 810, the method includes generating a video frame when executing a video game at a server. For example, a cloud gaming server may be executing a video game in a streaming mode, such that the CPU executes a video game responsive to input commands from a user in order to generate game rendered video frames using a graphics pipeline.

The server may perform additional operations in a scan-out process on the game generated video frames. For example, one or more overlays may be added to a corresponding game generated video frame, such as during a scan-out process. In particular, at 820, the method includes performing a scan-out process to generate and deliver a modified video frame to an encoder configured to compress the video frame. The scan-out process includes scanning the video frame scanline-by-scanline and one or more user interface features scanline-by-scanline to one or more input frame buffers, and compositing and blending the video frame and the one or more user interface (UX) features (e.g., as overlays including a user interface (UI), system UIs, text, messaging, etc.) into a modified video frame, wherein the scan-out process begins at a flip-time of the video frame. As such, the scan-out process generates a modified video frame that is composited and blended to include one or more optional UX features, such as those implemented through overlays.

At 830, the method includes transmitting the modified video frame that is compressed to a client. In particular, each modified video frame may be split into one or more encoder slices that are then compressed—as one or more encoded slices—by the encoder. That is, the encoder receives the modified video frame and encodes the modified video frame on an encoder slice-by-slice basis to generate one or more encoded slices which are then packetized and delivered through a network to a client.

At 840, the method includes determining at the client a target display time for the modified video frame. In particular, when scan-out of the server display buffer occurs at flip-time rather than the next occurrence of the server VSYNC signal, ideal display timing on the client side can be performed based on the time at which scan-out occurred at the server and the game's intent with regards to the specific display buffer (e.g., targeted display buffer VSYNC). Game intent determines whether a frame was targeted for the next client VSYNC, or actually targeted at a client's previous VSYNC because the game was running late in processing that frame.

At 850, the method includes scheduling at the client a display time for the modified video frame based on the target display time. Client side strategies for choosing when to display a frame may depend on whether the game is designed for a fixed frame rate or variable frame rate, and whether VSYNC timing information is implicit or explicit, as will be further described in relation to FIG. 8B below.

Figure 8B:
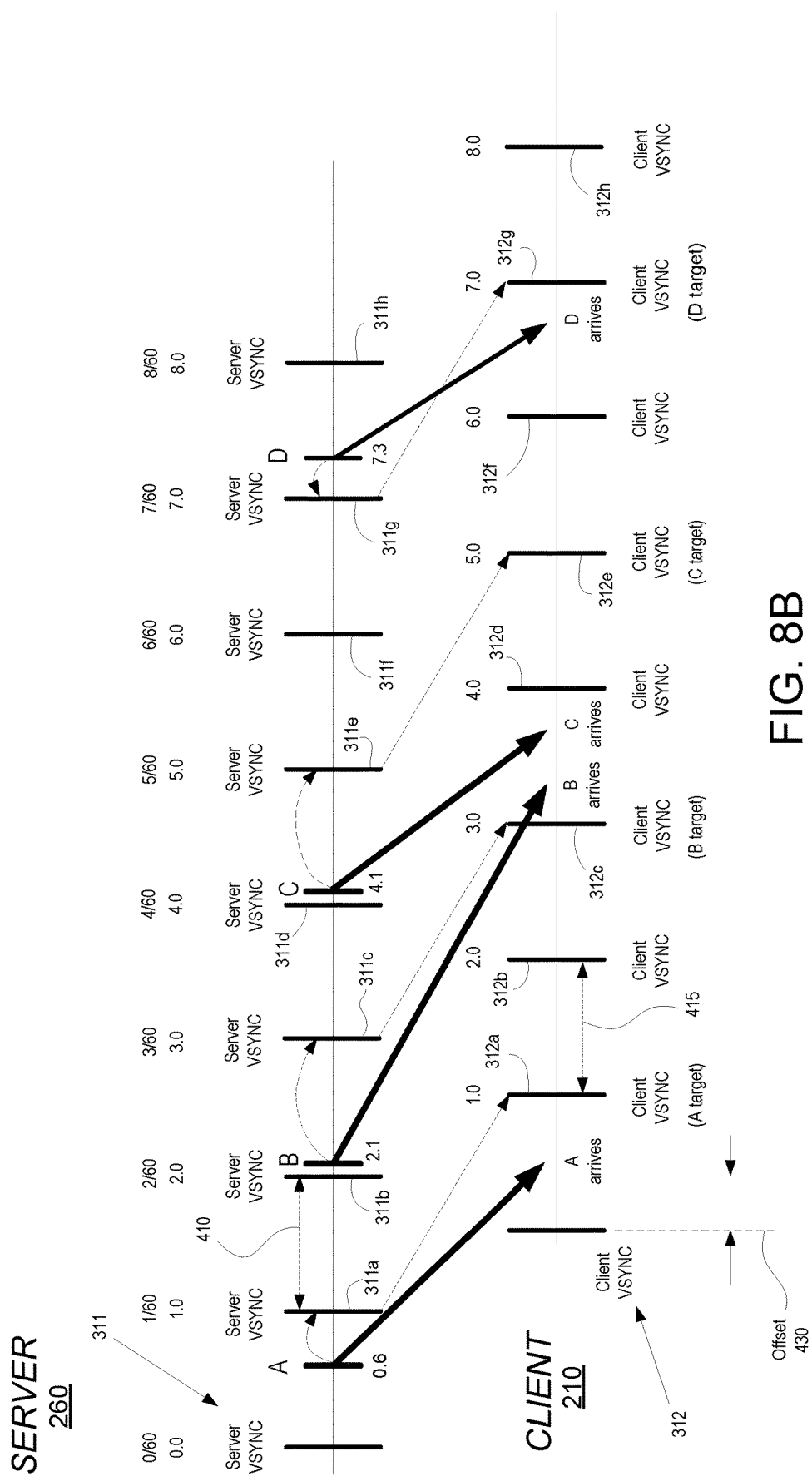
FIG. 8B illustrates a timing diagram of server and client operations performed during execution of a video game at the server to generate game rendered video frames that are then sent to a client for display, in accordance with one embodiment of the present disclosure.

FIG. 8B illustrates a timing diagram of server and client operations performed during execution of a video game at a server 260 to generate rendered video frames that are then sent to a client 210 for display, in accordance with one embodiment of the present disclosure. Because the client is aware of various timing parameters associated with each of the rendered video frames generated at the server that can be used to indicate and/or determine ideal display times, the client can decide when to display those video frames based on one or more strategies. In particular, an ideal display time for a corresponding rendered video frame generated at the server indicates when the gaming application executing on the server intends to display the rendered video frame with reference to a targeted occurrence of a server VSYNC signal. That targeted server VSYNC signal can be translated to a targeted client VSYNC signal, especially when server and client VSYNC signals are synchronized (e.g., frequency and timing) and aligned using an appropriate offset.

Desired synchronization and alignment between server and client VSYNC signals is shown in FIG. 8B. In particular, the frequencies of the server VSYNC signals 311 and the client VSYNC signals 312 are synchronized, such that they have the same frequency and corresponding frame period. For example, the frame period 410 of the server VSYNC signals 311 is substantially equal to the frame period 415 of the client VSYNC signals 312. In addition, the server and client VSYNC signals may be aligned with an offset 430. The timing offset may be determined such that a predetermined number (e.g., 99.99 percent) of received video frames arrive at the client to be displayed at the next appropriate occurrence of the client VSYNC signal. More particularly, the offset is set so that video frames received within the predetermined number and having the highest variability in one-way latency between server and client arrive just before the next appropriate occurrence of the client VSYNC signal for purposes of display. Proper synchronization and alignment allows for the use of ideal display times for video frames generated at the server that can be translated between the server and client.

In one embodiment, the timing parameters include an ideal display time to which a corresponding video frame is targeted for display. The ideal display time can be referenced to a targeted occurrence of a server VSYNC signal. That is, the ideal display time is explicitly provided in the timing parameters. In one embodiment, the timing parameters can be delivered from the server to the client via some mechanism within one of the packets used to deliver the encoded video frame. For example, the timing parameters could be added to a packet header, or the timing parameters could be part of the encoded frame data of a packet. In another embodiment, the timing parameters can be delivered from the server to the client using a GPU API to send data control packets. The GPU API may be configured to send the data control packets from the server to the client over the same data channel used for transmitting the rendered video frames that are compressed. The data control packets are formatted such that the client understands what type of information is included, and understands the proper referencing to the corresponding rendered video frame. In one implementation, the communications protocol used for the GPU API, the formatting for the data control packets may be defined in the corresponding software development kit (SDK) for the video game, the signaling information providing the client notification of a data control packet (e.g., provided in a header, provided in a data packet with a marker, etc.), etc. In one implementation, the data control packets bypass the encoding process as they are minimally sized.

In another embodiment, the timing parameters include a flip-time and a simulation time which are delivered from the server to the client, as previously described. The flip-time and simulation time can be used by the client to determine the ideal display time. That is, the ideal display time is implicitly provided in the timing parameters. The timing parameters may include other information that can be used to infer the ideal display time. In particular, the flip-time indicates when the flip of the display buffer occurs indicating that the corresponding rendered video frame is ready for transmission and/or display). The scan-out/scan-in process also occurs early at the flip-time, in one embodiment. Simulation time refers to the time it takes to render the video frame through the CPU and GPU pipeline. The determination of the ideal display time for a corresponding video frame depends on whether the game is executing at a fixed frame rate or a variable frame rate.

For a fixed frame rate game, the client may implicitly determine targeted VSYNC timing information from scan-out/scan-in timing (e.g., flip-time timestamp) and a corresponding simulation time. For example, the server notes and sends out the scan-out/scan-in time for a corresponding video frame to the client. The client may infer from scan-out/scan-in timing and the corresponding simulation time which is the targeted occurrence of the server VSYNC signal, which can be translated to a targeted occurrence of the client VSYNC signal. The client may explicitly determine targeted VSYNC timing information when the game provides ideal display timing (e.g., via the GPU API), which could be an integral VSYNC timing, or fractional VSYNC timing. Fractional VSYNC timing may be implemented when the processing time for a frame went beyond a frame period, wherein the ideal display timing may specify the simulation time or be based on the simulation time.

For a variable frame rate game, the client may implicitly determine ideal targeted VSYNC timing information from scan-out/scan-in timing and the simulation time for a corresponding video frame. For example, the server notes and sends out the scan-out time and simulation time for the corresponding frame to the client. The client may infer from the scan-out/scan-in timing and simulation time which is the targeted occurrence of the server VSYNC signal for displaying the corresponding video frame, wherein the targeted VSYNC signal can be translated to a corresponding targeted occurrence of the client VSYNC signal. In addition, the client may explicitly determine targeted VSYNC timing information when the game provides ideal timing via the GPU API. In this case, fractional VSYNC timing may be specified by the game, such as providing simulation time or display time.

As shown in FIG. 8B, server VSYNC signals 311 and client VSYNC signals 312 occur with a timing of 60 Hz. The server VSYNC signals 311 are synchronized (e.g., substantially equal frequencies) and aligned (e.g., with offset) with the client VSYNC signals 312. For example, occurrences of server VSYNC signals can be aligned with occurrences of client VSYNC signals. In particular, occurrence of server VSYNC signal 311a corresponds to the occurrence of client VSYNC signal 312a, server VSYNC signal 311c corresponds to client VSYNC signal 312c, server VSYNC signal 311d corresponds to client VSYNC signal 312d, server VSYNC signal 311e corresponds to client VSYNC signal 312e, and so on.

For purposes of illustration, the server 260 is executing a video game that is running at 30 Hz, such that rendered video frames are generated during a frame period (33.33 milliseconds) at 30 Hz (e.g., corresponding to 30 frame periods per second). As such, the video game could be rendering up to 30 frames per second. Ideal display timing is also shown for corresponding video frames. The ideal display timing may reflect the intent of the game to display video frames. As previously described, the ideal display timing may be determined from the flip-time of each frame, which is also shown. That ideal display time can be used by the client to determine when to display video frames depending on the strategy employed, as described below. For example, video frame A was rendered and ready for display at flip-time 0.6 (e.g., 0.6/60 at 60 Hz). Also, the ideal display timing for video frame A is targeted for display at the occurrence of server VSYNC signal 311a, which translates to being targeted for display at the client on the client VSYNC signal 312a. Similarly, video frame B was rendered and ready for display at flip-time 2.1 (e.g., 2.1/60 at 60 Hz). The ideal display timing for video frame B is targeted for display at the occurrence of server VSYNC signal 311c, which translates to being targeted for display at the client on the client VSYNC signal 312c. Also, video frame C was rendered and ready for display at flip-time 4.1 (e.g., 4.1/60 at 60 Hz). The ideal display timing for video frame C is targeted for display at the occurrence of server VSYNC signal 311e, which translates to being targeted for display at the client on the client VSYNC signal 312e. Also, video frame D was rendered and ready for display at flip-time 7.3 (e.g., 7.3/60 at 60 Hz). The ideal display timing for video frame D is targeted for display at the occurrence of server VSYNC signal 311g, which translates to being targeted for display at the client on the client VSYNC signal 312g.

One problem illustrated in FIG. 8B is that video frame D took longer than anticipated to generate, such that the flip-time for video frame D occurs at 7.3, which is after the targeted occurrence of the server VSYNC signal 311g. That is, the server 260 should have completed rendering video frame D before the occurrence of server VSYNC signal 311g. However, because the ideal display time for video frame D is known or can be determined, the client can still display video frame D at the occurrence of client VSYNC signal 312g which aligns with the ideal display time (e.g., server VSYNC signal 311g), even though the server missed its timing for generating the video frame.

Another problem illustrated in FIG. 8B is that although video frame B and video frame C are generated with appropriate timing at server 260 (e.g., targeted for display at different server VSYNC signals), because of additional latency experienced during transmission, video frame B and video frame C are received at the client within the same frame period, such that both are seemingly targeted for display at the client at the occurrence of the same client VSYNC signal 312d. For example, delays in transmission have video frame B and video frame C arriving in the same frame period. However, with appropriate buffering and knowledge of the ideal display timing for both video frames B and C, the client can determine how and when to display those video frames depending on which strategy is implemented, including follow game's intent, favor latency, favor smoothness, or adjusting client side VBI settings for variable refresh rate displays.

For example, one strategy is to follow the intent of the game as determined during execution on the server. The intent may be inferred from the timing of flip-times for corresponding video frames, such that that video frames A, B and C are intended for display at the next server VSYNC signal. The intent may be explicitly known as communicated by the video game, such that video frame D is intended for display at a previous server VSYNC signal 311e, even though it finished rendering after that VSYNC signal. In addition, the ambiguity of similarly arriving video frames B and C at the client (e.g., arrive within the same frame period) would be resolved by following the intent of the game. As such, with appropriate buffering, the client may display the video frames at 60 Hz (each frame displayed for 16.66 ms) in the following sequence: A—A—A—B—C—C—D—D, etc.

A second strategy is to favor latency over frame display smoothness, such that the goal is to reduce latency as much as possible and using the least amount of buffering. That is, video frames are displayed in an effort to quickly address latency by displaying the latest received video frame at the next client VSYNC signal. As such, the ambiguity of similarly arriving video frames B and C at the client (e.g., arrive within the same frame period) would be resolved by dropping video frame B, and just displaying video frame C at the next client VSYNC signal. This would sacrifice frame smoothness during display because video frame B would be skipped in the sequence of displayed video frames, which may be noticeable to the viewer. As such, with appropriate buffering, the client may display the video frames at 60 Hz (each frame displayed for 16.66 ms) in the following sequence: A—A—A—C—C—C—D—D, etc.

A third strategy is to favor frame display smoothness over latency. In this case, additional latency is not a factor and can be taken care of through appropriate buffering. That is, video frames are displayed in a manner to give the viewer the best viewing experience. The client uses time between target VSYNCs as a guide, e.g. the time between B target 312c and C target 312e is two VSYNCs, so B should be displayed for two frames irrespective of arrival time of B and C at client; the time between C target 312e and D target 312g is two VSYNCs, so C should be displayed for two frames irrespective of arrival time of C and D at client, etc. As such, with appropriate buffering, the client may display the video frames at 60 Hz (each frame displayed for 16.66 ms) in the following sequence: A—A—A—B—B—C—C—D—D, etc.

A fourth strategy provides for adjusting client side VBI timing for displays supporting variable refresh rates. That is, a variable refresh rate display allows for increasing or reducing the VBI interval when displaying a video frame to implement an instantaneous frame rate for displaying video frames that are rendered at the client for display. For example, instead of displaying video frames rendered for display at the client at each client VSYNC signal, which may require displaying a video frame twice when waiting for a delayed video frame, the refresh rate of the display may be dynamically adjusted for each video frame that is rendered for display. As such, video frames may be displayed to adjust for variability in latency when receiving, decoding, and rendering for display video frames at the client. In the example shown in FIG. 8B, although video frame B and video frame C are generated with appropriate timing at server 260 (e.g., targeted for display at different server VSYNC signals), because of additional latency experienced during transmission, video frame B and video frame C are received at the client within the same frame period. In this case, video frame B may be displayed for a shorter period of time than intended (e.g., less than a frame period), such that video frame C may be rendered at the client determined and targeted client VSYNC signal. For instance, video frame C may have a targeted occurrence of a server VSYNC signal that is then translated to a targeted client VSYNC signal, especially when server and client VSYNC signals are synchronized (e.g., frequency and timing) and aligned using an appropriate offset.

Figure 9:
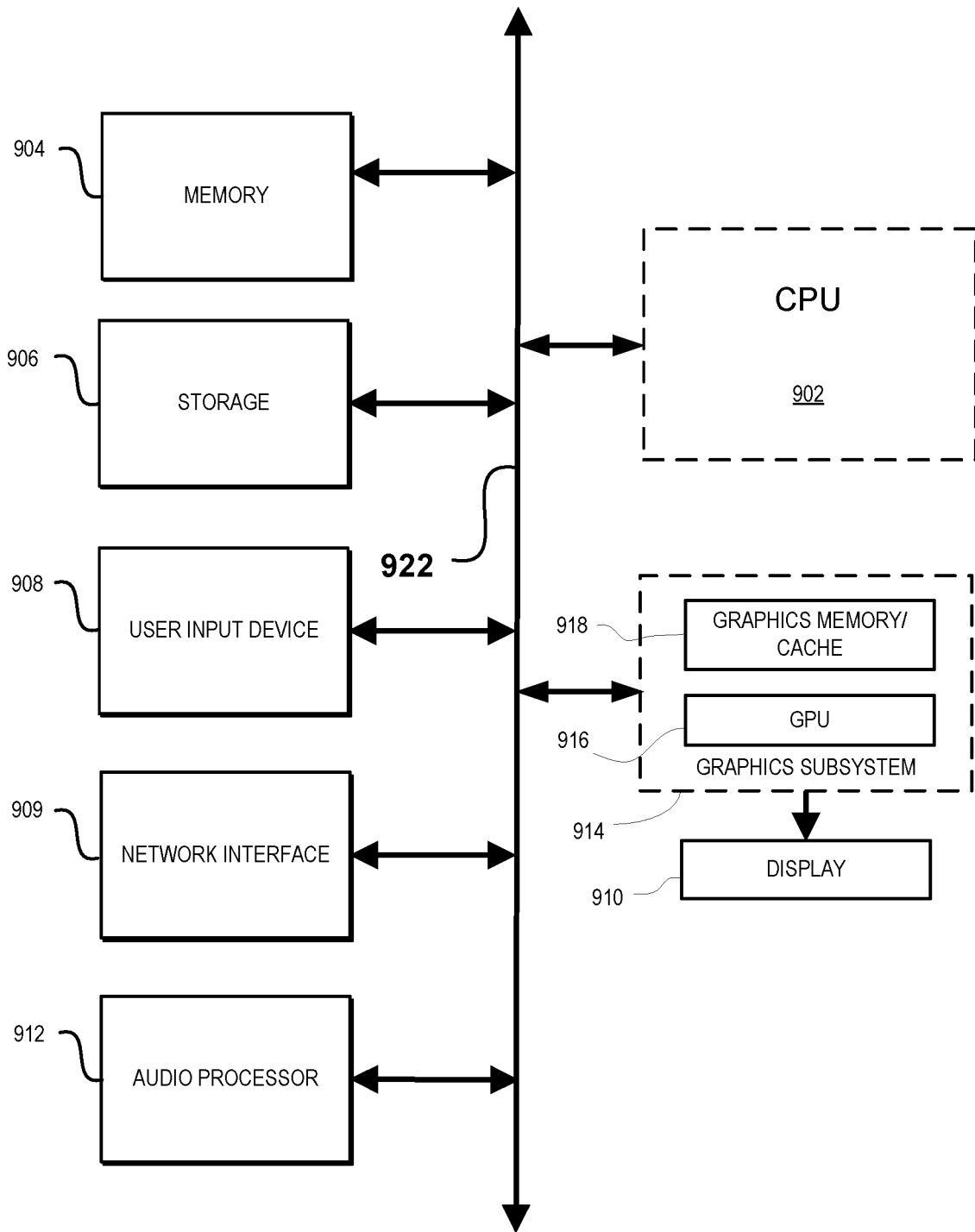
FIG. 9 illustrates components of an example device that can be used to perform aspects of the various embodiments of the present disclosure.

FIG. 9 illustrates components of an example device 900 that can be used to perform aspects of the various embodiments of the present disclosure. For example, FIG. 9 illustrates an exemplary hardware system suitable for streaming media content and/or receiving streamed media content, including performing high speed scan-out operations or performing scan-out earlier, such as before an occurrence of the next system VSYNC signal or at a flip time of the corresponding video frame, for delivery of modified video frames to an encoder when streaming content from a video game executing at a cloud gaming server across a network, in accordance with embodiments of the present disclosure. This block diagram illustrates a device 900 that can incorporate or can be a personal computer, a server computer, gaming console, mobile device, or other digital device, each of which is suitable for practicing an embodiment of the invention. Device 900 includes a central processing unit (CPU) 902 for running software applications and optionally an operating system. CPU 902 may be comprised of one or more homogeneous or heterogeneous processing cores.

In accordance with various embodiments, CPU 902 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 904 stores applications and data for use by the CPU 902 and GPU 916. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, and/or microphones. Network interface 909 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, graphics subsystem 914 including GPU 916 and GPU cache 918, memory 904, data storage 906, user input devices 908, network interface 909, and audio processor 912 are connected via one or more data buses 922.

A graphics subsystem 914 is further connected with data bus 922 and the components of the device 900. The graphics subsystem 914 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 916, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from graphics memory 918 to be displayed on display device 910, or to be projected by a projection system (not shown). Display device 910 can be any device capable of displaying visual information in response to a signal from the device 900, including CRT, LCD, plasma, and OLED displays. Device 900 can provide the display device 910 with an analog or digital signal, for example.

Other embodiments for optimizing the graphics subsystem 914 could include multi-tenancy GPU operations where a GPU instance is shared between multiple applications, and distributed GPUs supporting a single game. The graphics subsystem 914 could be configured as one or more processing devices.

For example, the graphics subsystem 914 may be configured to perform multi-tenancy GPU functionality, wherein one graphics subsystem could be implementing graphics and/or rendering pipelines for multiple games, in one embodiment. That is, the graphics subsystem 914 is shared between multiple games that are being executed.

In other embodiments, the graphics subsystem 914 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for streaming media content and/or receiving streamed media content, including performing high speed scan-out operations or performing scan-out earlier, such as before an occurrence of the next system VSYNC signal or at a flip time of the corresponding video frame, for delivery of modified video frames to an encoder when streaming content from a video game executing at a cloud gaming server across a network.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method of cloud gaming, comprising:
aligning a server VSYNC signal of a server and a client VSYNC signal of a client;
receiving at the client from the server a video frame that is encoded;
receiving at the client from the server timing information for the video frame;
determining a target display time of the video frame based on the timing information, wherein the target display time is a targeted occurrence of the server VSYNC signal;
translating the target display time to a targeted occurrence of the client VSYNC signal; and
scheduling a display time for the video frame based on the targeted occurrence of the client VSYNC signal.

2. The method of claim 1,
wherein the timing information includes a time at which scan-out of the video frame started at the server.

3. The method of claim 1,
wherein the timing information identifies the targeted occurrence of the server VSYNC signal.

4. The method of claim 1,
wherein the display time is a fractional occurrence of the targeted occurrence of the client VSYNC signal.

5. The method of claim 1, further comprising:
receiving in the timing information a flip-time and a simulation time associated with the video frame; and
determining the targeted occurrence of the server VSYNC signal based on the flip-time and the simulation time,
wherein scan-out of the video frame to an encoder occurs at the flip-time,
wherein the simulation time indicates a time taken to generate the video frame.

6. The method of claim 1, further comprising:
providing an offset between the server VSYNC signal and the client VSYNC signal,
wherein the offset is determined based on a predetermined number of video frames that are received right before a corresponding next occurrence of the client VSYNC signal,
wherein the server VSYNC signal and the client VSYNC signal are aligned to a frequency.

7. The method of claim 1, further comprising:
sending the timing information in a data control packet using a graphics pipeline unit (GPU) application programming interface (API).

8. A non-transitory computer-readable medium storing a computer program for cloud gaming, the computer-readable medium comprising:

program instructions for aligning a server VSYNC signal of a server and a client VSYNC signal of a client;

program instructions for receiving at the client from the server a video frame that is encoded;

program instructions for receiving at the client from the server timing information for the video frame;

program instructions for determining a target display time of the video frame based on the timing information, wherein the target display time is a targeted occurrence of the server VSYNC signal;

program instructions for translating the target display time to a targeted occurrence of the client VSYNC signal; and program instructions for scheduling a display time for the video frame based on the targeted occurrence of the client VSYNC signal.

9. The non-transitory computer-readable medium of claim 8,
wherein in the method the timing information includes a time at which scan-out of the video frame started at the server.

10. The non-transitory computer-readable medium of claim 8,
wherein in the method the timing information identifies the targeted occurrence of the server VSYNC signal.

11. The non-transitory computer-readable medium of claim 8,
wherein in the method the display time is a fractional occurrence of the targeted occurrence of the client VSYNC signal.

12. The non-transitory computer-readable medium of claim 8, further comprising:
program instructions for receiving in the timing information a flip-time and a simulation time associated with the video frame; and
program instructions for determining the targeted occurrence of the server VSYNC signal based on the flip-time and the simulation time,
wherein scan-out of the video frame to an encoder occurs at the flip-time,
wherein the simulation time indicates a time taken to generate the video frame.

13. The non-transitory computer-readable medium of claim 8, further comprising:
program instructions for providing an offset between the server VSYNC signal and the client VSYNC signal,
wherein the offset is determined based on a predetermined number of video frames that are received right before a corresponding next occurrence of the client VSYNC signal,
wherein the server VSYNC signal and the client VSYNC signal are aligned to a frequency.

14. The non-transitory computer-readable medium of claim 8, further comprising:

program instructions for sending the timing information in a data control packet using a graphics pipeline unit (GPU) application programming interface (API).

15. A computer system comprising:
a processor; and
memory coupled to the processor and having stored therein instructions that, if executed by the computer system, cause the computer system to execute a method for cloud gaming comprising:
aligning a server VSYNC signal of a server and a client VSYNC signal of a client;
receiving at the client from the server a video frame that is encoded;
receiving at the client from the server timing information for the video frame;
determining a target display time of the video frame based on the timing information, wherein the target display time is a targeted occurrence of the server VSYNC signal;
translating the target display time to a targeted occurrence of the client VSYNC signal; and
scheduling a display time for the video frame based on the targeted occurrence of the client VSYNC signal.

16. The computer system of claim 15,
wherein in the method the timing information includes a time at which scan-out of the video frame started at the server.

17. The computer system of claim 15,
wherein in the method the timing information identifies the targeted occurrence of the server VSYNC signal.

18. The computer system of claim 15,
wherein in the method the display time is a fractional occurrence of the targeted occurrence of the client VSYNC signal.

19. The computer system of claim 15, the method further comprising:
receiving in the timing information a flip-time and a simulation time associated with the video frame; and
determining the targeted occurrence of the server VSYNC signal based on the flip-time and the simulation time,
wherein scan-out of the video frame to an encoder occurs at the flip-time,
wherein the simulation time indicates a time taken to generate the video frame.

20. The computer system of claim 15, the method further comprising:
providing an offset between the server VSYNC signal and the client VSYNC signal,
wherein the offset is determined based on a predetermined number of video frames that are received right before a corresponding next occurrence of the client VSYNC signal,
wherein the server VSYNC signal and the client VSYNC signal are aligned to a frequency.

* * * * *